US010067020B2

(12) United States Patent
McILravey

(10) Patent No.: US 10,067,020 B2
(45) Date of Patent: Sep. 4, 2018

(54) LOAD PIN FOR MEASURING FORCE HAVING A DIFFERENTIAL BRIDGE ELECTRONIC CIRCUIT

(71) Applicant: Concept Torque Solutions Inc., Red Deer (CA)

(72) Inventor: Wayne McILravey, Red Deer (CA)

(73) Assignee: Concept Torque Solutions Inc., Red Deer (CA)

( * ) Notice: Subject to any disclaimer, the term of this patent is extended or adjusted under 35 U.S.C. 154(b) by 0 days.

(21) Appl. No.: 14/971,578

(22) Filed: Dec. 16, 2015

(65) Prior Publication Data

US 2016/0109310 A1    Apr. 21, 2016

Related U.S. Application Data

(63) Continuation of application No. 14/043,486, filed on Oct. 1, 2013, now abandoned, which is a continuation of application No. 13/736,011, filed on Jan. 7, 2013, now Pat. No. 8,943,904.

(60) Provisional application No. 61/749,310, filed on Jan. 5, 2013.

(51) Int. Cl.
    *G01L 5/16*    (2006.01)
    *G01L 5/00*    (2006.01)

(52) U.S. Cl.
    CPC ............ *G01L 5/161* (2013.01); *G01L 5/0042* (2013.01); *G01L 5/0061* (2013.01)

(58) Field of Classification Search
    CPC ... E02D 7/14; F16C 11/04; G01L 3/14; G01L 5/0061; G01L 5/0042; Y10T 403/32951
    USPC ........................................ 73/862.045, 862.08
    See application file for complete search history.

(56) References Cited

U.S. PATENT DOCUMENTS

| 3,695,096 | A | | 10/1972 | Kutsay |
| 3,754,610 | A | * | 8/1973 | Paelian ................ G01G 3/1404 |
| | | | | 177/211 |
| 4,295,801 | A | | 10/1981 | Bennett |
| 4,576,053 | A | * | 3/1986 | Hatamura ................ E02F 9/26 |
| | | | | 338/5 |
| 5,548,397 | A | | 8/1996 | Kool |
| 5,765,437 | A | | 6/1998 | Farber |
| 5,791,820 | A | | 8/1998 | Rempel |
| 6,032,520 | A | * | 3/2000 | Miyazaki ................ B60T 8/171 |
| | | | | 73/115.07 |
| 6,216,533 | B1 | * | 4/2001 | Woloson ............ E21B 47/0006 |
| | | | | 166/250.01 |
| 7,338,232 | B2 | | 3/2008 | Nasr |
| 8,443,918 | B2 | | 5/2013 | Massari |
| 8,500,370 | B2 | | 8/2013 | Ditillo |
| 8,966,953 | B2 | | 3/2015 | Kasprick |

FOREIGN PATENT DOCUMENTS

CN    101650239    1/2011

* cited by examiner

*Primary Examiner* — Harshad R Patel
*Assistant Examiner* — Brandi Hopkins
(74) *Attorney, Agent, or Firm* — Nyemaster Goode, PC

(57) ABSTRACT

A system to measure the installation torque of a screw pile comprises machinery suitable to drive the screw pile into the ground, said machinery further comprising a rotary drive suspended by means of a universal joint-type coupler. A load pin, having at least one sensor, is mounted through the universal joint-type coupler as a pivot pin and is oriented within the universal joint-type coupler so that at least some of the installation torque is transmitted through said load pin and is measurable by said at least one sensor. Preferably, a differential bridge network is used to obtain a measurable signal from the plurality of sensors.

16 Claims, 17 Drawing Sheets

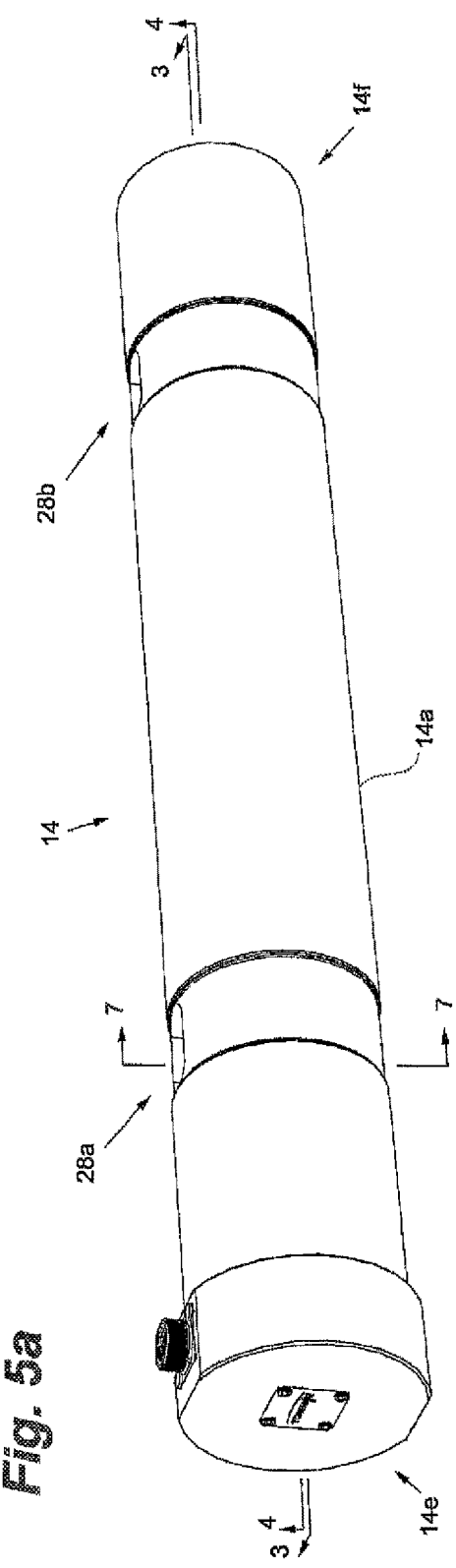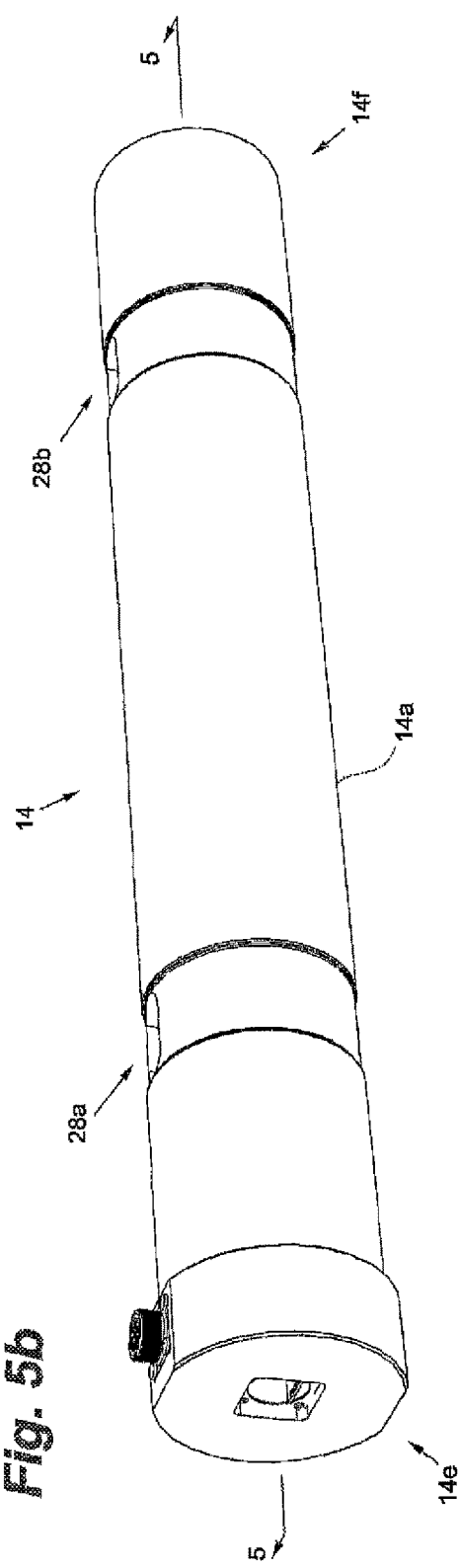

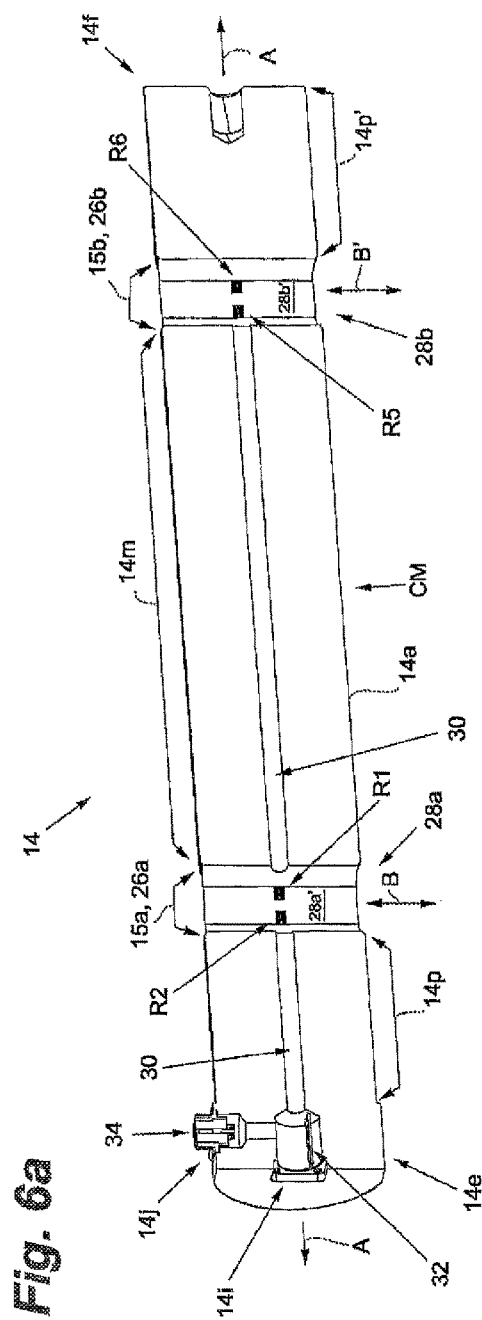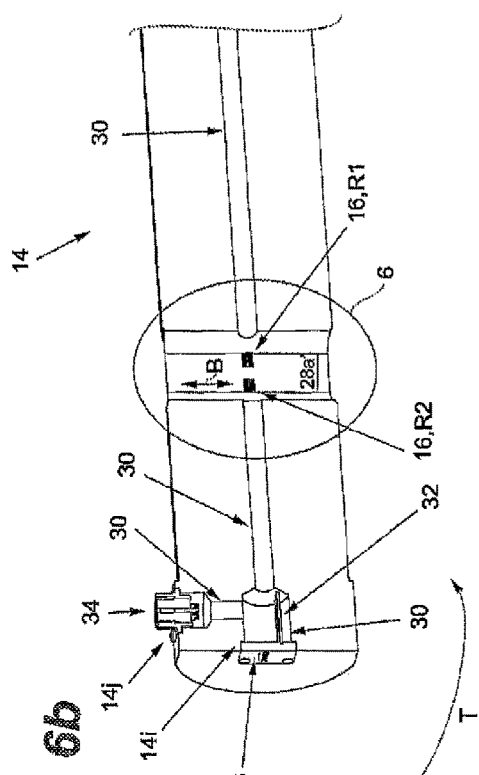

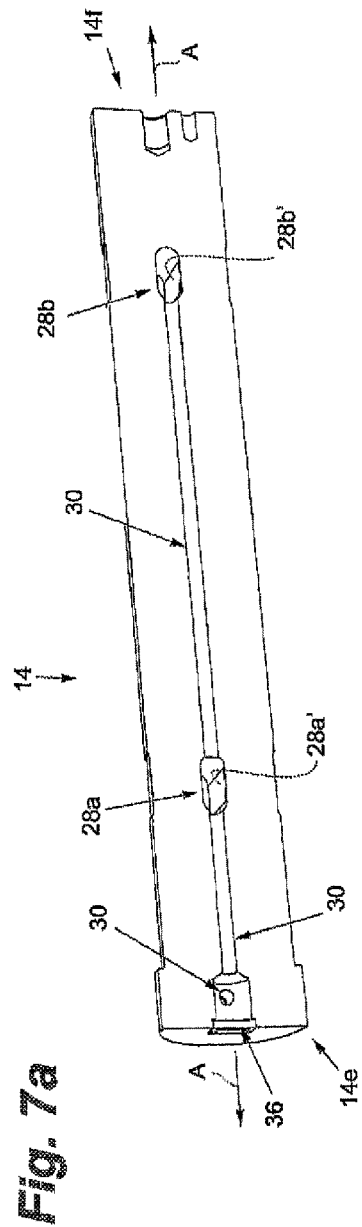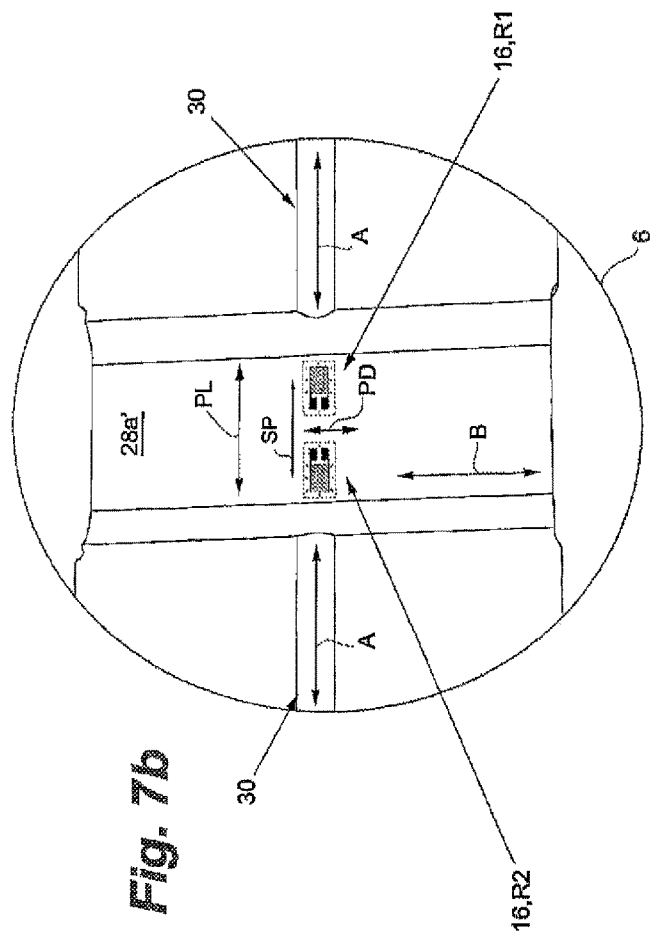

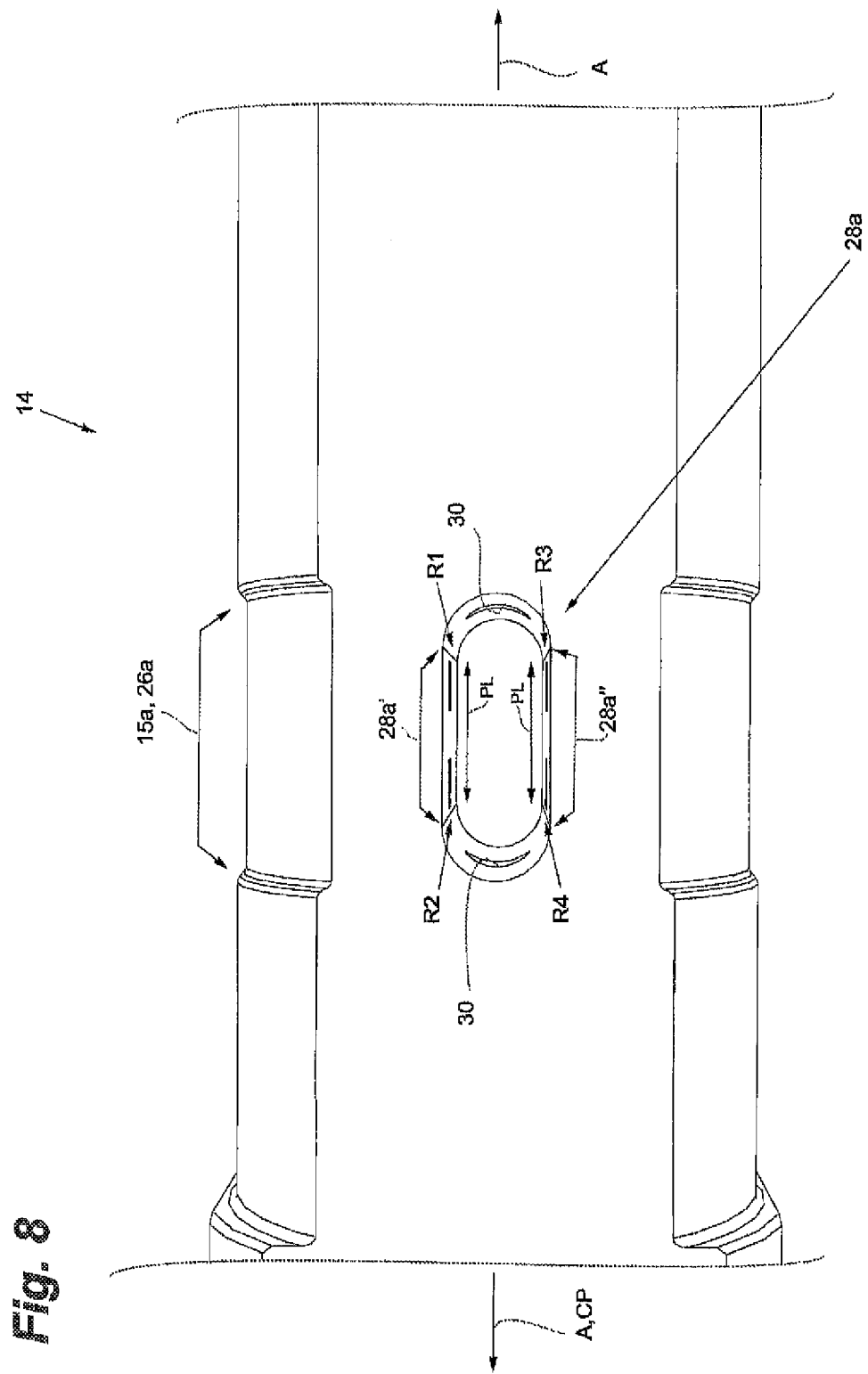

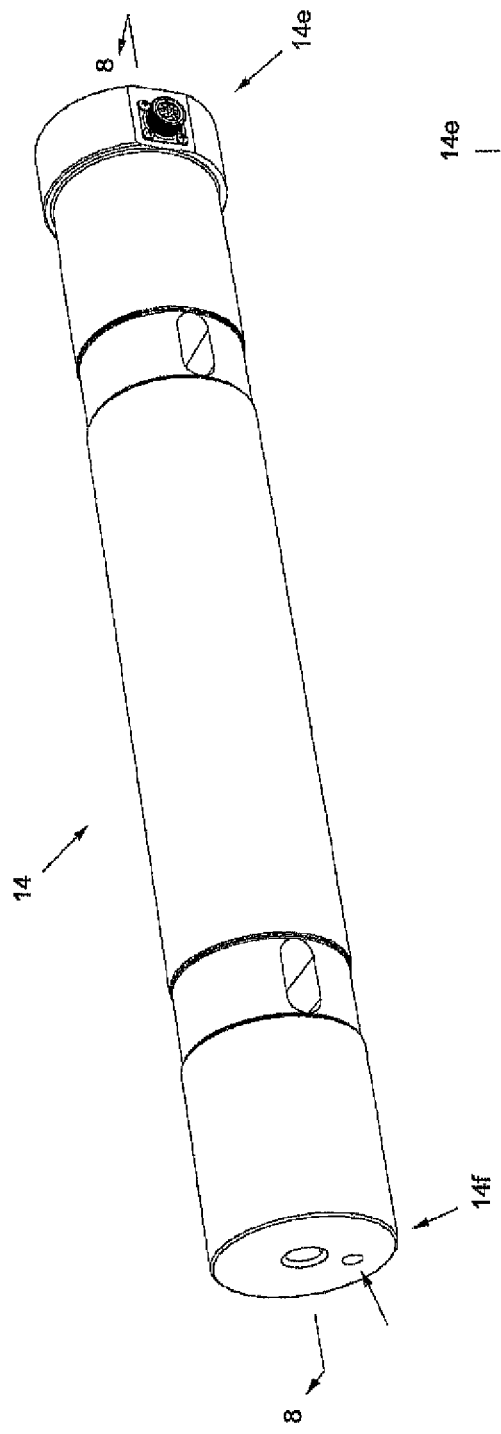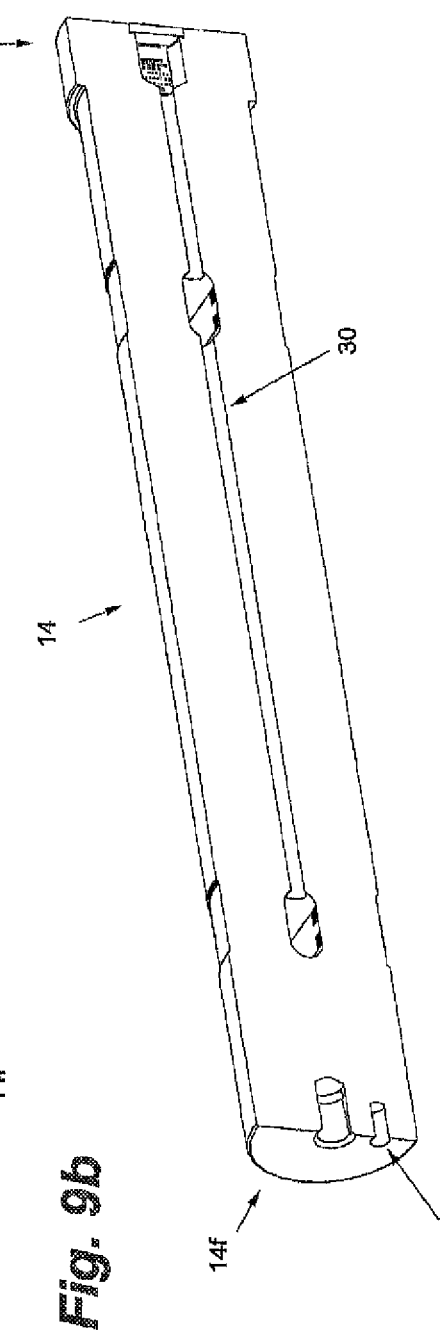

Fig. 11a - Torque (counter-clockwise)
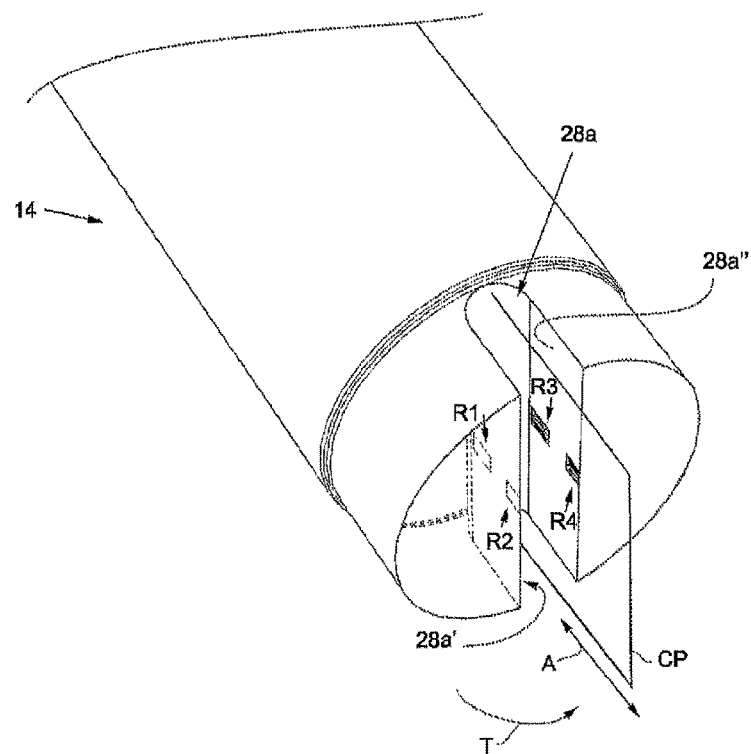
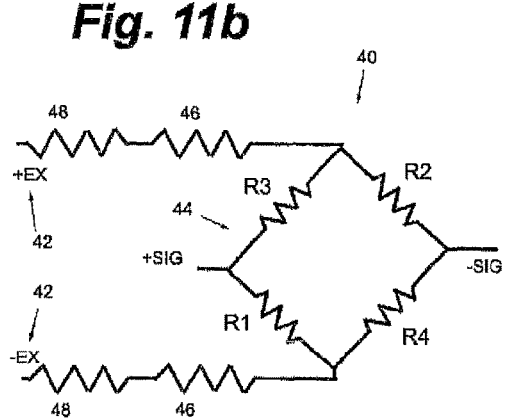
Fig. 11b
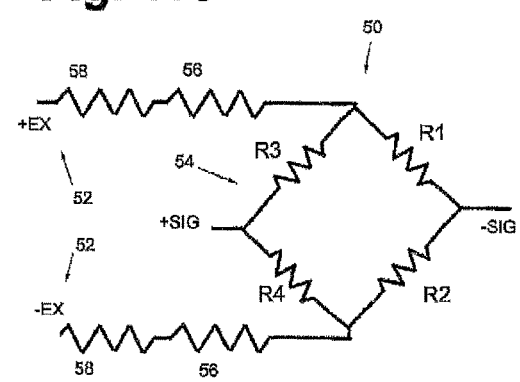
Fig. 11c

LOAD PIN FOR MEASURING FORCE HAVING A DIFFERENTIAL BRIDGE ELECTRONIC CIRCUIT

CROSS REFERENCE TO RELATED APPLICATION

This application is a Continuation of U.S. patent application Ser. No. 14/043,486 filed Oct. 1, 2013 which is a Continuation-In-Part of U.S. Pat. No. 8,943,904 issued on Feb. 3, 2015 which is a non-provisional of U.S. Provisional Patent Application Ser. No. 61/749,310 filed Jan. 5, 2013 and entitled, "LOAD CELL FOR SCREW PILING POWER HEAD", the entirety of these applications is incorporated herein by reference.

FIELD OF THE INVENTION

The present invention relates generally to equipment and techniques for measuring torque applied to objects and, more particularly, to a load cell to measure torque applied to a screw piling by a rotary drive.

BACKGROUND OF THE INVENTION

The background information discussed below is presented to better illustrate the novelty and usefulness of the present invention. This background information is not admitted prior art.

Screw piling or screwpiles are a steel screw-in piling and ground anchoring system used for building foundations, pipeline tie-downs and in other applications. Screw pile(s), as used herein, includes screw piling, steel screw-in foundations, screw piers, helical piles, helical anchors, screw anchors, screw foundations and helical piers. They are often necessary for building foundations where the ground is not compacted, or strong enough or of variable capacity to carry a building structure. Screwpiles are typically manufactured using varying sizes of tubular hollow sections for the pile or anchor shaft. The pile shaft transfers a structure's load into the pile. Helical steel plates, or helixes, are welded to the pile shaft in accordance with the intended ground conditions.

To install screw piling, they are typically wound into the ground much like a screw into wood. Screw piles are preferably installed using earthmoving equipment or mobile machinery fitted with drive attachments which may include rotary drives, rotary drivers, powerheads or drive heads, see, for example, FIGS. 1a and 1b. The mobile machinery varies from skid-steer loaders to 5 ton through 30 ton excavators. Rotary drives, generally with torque capacities ranging from 5,000 Nm to 300,000 Nm, are custom fitted using various boom configurations. Drive attachments generally connect the screwpile to the machine. Likewise, hinged attachment means, such as a universal joint-type coupler, are often employed to suspend the rotary drive attachment from the boom of the mobile machinery; see, for example, FIG. 1b. One or more pivot pins may be utilized to connect the coupler to the boom and the drive attachment see, for example, the coupler disclosed in U.S. Pat. No. 6,942,430.

The level of torque that is required to turn the screw pile is indicative of the strength of the soil, and can be used to predict the capacity of the pile. Low installation torque indicates a weak soil and low pile capacity, whereas high installation torque indicates a relatively strong soil and greater pile capacity. Where the required installation torque can be accurately measured, the approximate holding capacity of a screw pile can be reliably predicted.

Traditionally, estimates of installation torque were made using hydraulic pressure gauges (to measure the amount of hydraulic pressure provided to a rotary drive), assumed or estimated gearbox ratios and compensation for any hydraulic motor losses. However, such estimates are fairly inaccurate and may not reliably predict a screw pile's holding capacity. As such, various devices and systems have been created to more accurately measure the installation torque of a screw pile.

One example is that by Pro-Dig, LLC of Kansas, U.S.A., which markets a screw pile torque monitoring system under the trade-mark INTELLI-TORK™. This system comprises a flanged member that mounts between the rotary drive and the screw piling and, therefore, rotates along with the screw piling as it is driven into the ground. As the rotary drive imparts torque to the screw piling, sensors in the flanged member measure this torque. Because this flanged member rotates along with screw piling it must send its measurements wirelessly to a display or recorder. As such, one disadvantage of this system is that such wireless signals may be subject to interference from the vibrations created during screw piling installation, especially as the screw piling is almost installed and the flanged member is driven closer to the ground.

A further disadvantage of this system is that the flanged member adds additional length to the rotary drive/screw pile assembly, thereby shortening the maximum length of screw pile that can potentially be installed using a particular mobile machinery. Yet a further disadvantage is that the INTELLI-TORK™ system also appears to be subject to interference from downward forces that may be applied by the mobile machinery as it pushes the rotary drive/screw pile assembly downwards during installation.

Another example is that by Russell Heale Engineering Pty Ltd of Burleigh Heads, Queensland, Australia, which markets a screw pile torque monitoring system under the trademark TORQATRON™. This system comprises a load cell member that mounts between the boom of the mobile machinery and the rotary drive. Unlike the flanged member of the INTELLI-TORK™ system, this load cell member does not rotate with the screw piling as it is driven into the ground (since it is mounted between above the rotary drive and to the boom). As such, wired connections can be used to transmit signals from the load/torque sensors in the TORQATRON™. However, this device and system does suffer from the other disadvantages present in the INTELLI-TORK™ system, namely that the load cell member adds additional length to the boom/rotary drive/screw pile assembly, thereby shortening the maximum length of screw pile that can potentially be installed using a particular mobile machinery that it also appears to be subject to interference from downward forces that may be applied by the mobile machinery as it pushes the boom/rotary drive/screw pile assembly downwards during installation.

Therefore, what is needed is a system and apparatus to measure the installation torque of a screw pile which is simple in design and does not have the above-mentioned disadvantages.

SUMMARY OF THE INVENTION

The present invention is directed to overcoming the prior art deficiencies in load cells used to measure torque applied to a screw piling by a rotary drive, such being subject to interference from downward forces and such as adding additional length to the boom, rotary drive and screw pile assembly during operations.

In one aspect the invention provides a system to measure the installation torque of a screw pile which comprises machinery suitable to drive the screw pile into the ground, said machinery further comprising a rotary drive suspended by means of a universal joint-type coupler. A load pin, having at least one sensor, is mounted through the universal joint-type coupler as a pivot pin and is oriented within the universal joint-type coupler so that at least some of the installation torque is transmitted through said load pin and is measurable by said at least one sensor.

In one embodiment, the load pin further comprises a pair of bores and a set of four foil gauge strain gauge sensors are mounted within each of the pair of bores in a mirror-like fashion, with one bore being the mirror image of the other. In one embodiment, a differential bridge network is used to obtain a measurable signal from the plurality of sensors.

In another embodiment, the load pin further comprises at least one opening ("pocket") which is milled to be set in the pin a certain distance from the pin's surface, but the pocket does not extend through the pin. Two pockets may be milled into opposing sides of the pin with one pocket being a mirror image of the other. A strain gauge is mounted within each pocket to measure force. In one embodiment a differential bridge network may be used to obtain a measurable signal from the strain gauges.

BRIEF DESCRIPTION OF THE DRAWINGS

Referring to the drawings, several aspects of the present invention are illustrated by way of example, and not by way of limitation, in detail in the figures, wherein:

FIG. 2b is an enlarged view of the embodiment of FIG. 2a, taken of area 6 in FIG. 2a;

FIGS. 5a and 5b are perspective views of the load cell of the embodiment of FIG. 2a, with access cover being removed in FIG. 5b;

FIG. 6a is a sectioned perspective view of the load cell of the embodiment of FIG. 2a, taken along line 5-5 in FIG. 5b;

FIG. 6b is a sectioned perspective view of the load cell of the embodiment of FIG. 2a, taken along line 3-3 in FIG. 5a;

FIG. 7a is a sectioned perspective view of the load cell of the embodiment of FIG. 2a, taken along line 4-4 in FIG. 5a;

FIG. 7b is an enlarged view of the embodiment of FIG. 2a, taken of area 6 in FIG. 6b;

FIG. 8 is another sectioned perspective view of the load cell of the embodiment of FIG. 2a;

FIG. 9a is a another perspective view of the load cell of the embodiment of FIG. 2a;

FIG. 9b a sectioned perspective view of the load cell of the embodiment of FIG. 2a, taken along line 8-8 in FIG. 9a;

FIG. 11a is another sectioned perspective view of the load cell of the embodiment of FIG. 2a, taken along line 7-7 in FIG. 5a, wherein the load cell is being subjected to an installation torque force of 5000 lb while it is installed in a coupler of a preferred system embodiment;

FIG. 11b is an electrical schematics of how a Wheatstone bridge network electrically connects a preferred embodiment of four strain gauges and illustrating one example of an output signal (voltage) generated by the stresses on the load cell of FIG. 11a as it experienced the 5000 lb installation torque force;

FIG. 11c is an electrical schematics of a differential bridge network employed by the invention to electrically connect a preferred embodiment of four strain gauges and illustrating one example of an output signal (voltage) generated by the stresses on the load cell of FIG. Ha as it experienced the 5000 lb installation torque force;

FIG. 12b is an electrical schematics of a preferred pair of Wheatstone bridge networks electrically connecting the eight strain gauges of the load cell of FIG. 12a; and FIG. 12c is an electrical schematics of a preferred pair of differential bridge networks electrically connecting the eight strain gauges of the load cell of FIG. 12a.

DEFINITION SECTION

Figure 1A:
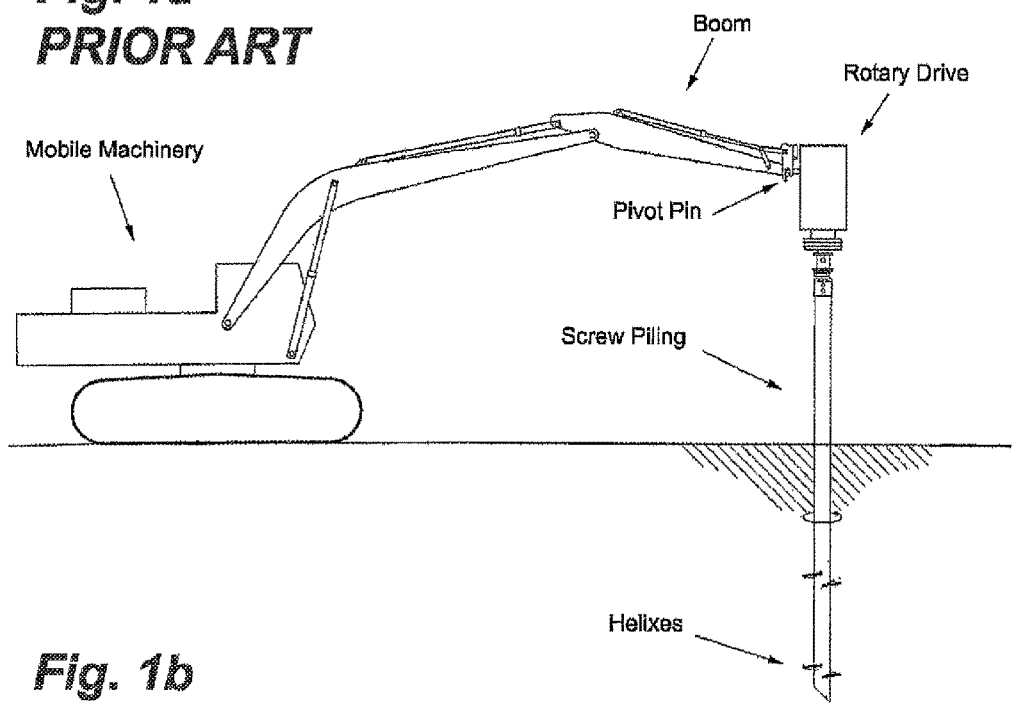
FIG. 1a is a side view of a PRIOR ART system for installing screw pilings.
Figure 1B:
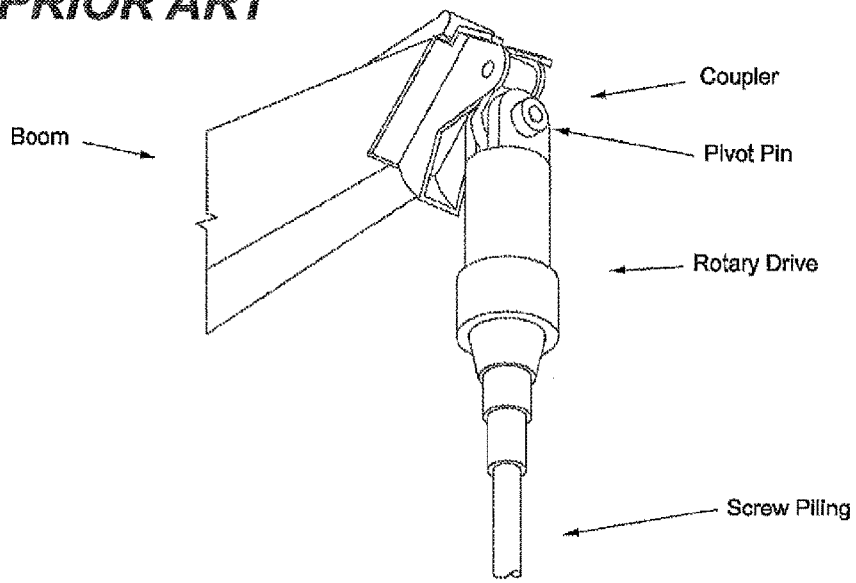
FIG. 1b is a perspective view of another PRIOR ART system for installing screw pilings wherein the rotary drive is suspended from a boom by a universal joint coupler.

Horizontal plane, as used herein, refers to a plane that is horizontal at a given point if it is perpendicular to the gradient of the gravity field at that point, in other words, apparent gravity is what makes a plumb bob hang perpendicular to the plane at that point. In other words a horizontal plane in the plane that is perpendicular to the line that passes through the center of the Earth.

Vertical plane, as used herein, refers in astronomy, geography, geometry, and related sciences and contexts, to a direction passing by a given point if it is locally aligned with the gradient of the Earth's gravity field, i.e., with the direction of the gravitational force (per unit mass, i.e. gravitational acceleration vector) at that point.

DETAILED DESCRIPTION OF THE PREFERRED EMBODIMENTS

The following description is of a preferred embodiment by way of example only and without limitation to the combination of features necessary for carrying the invention into effect. Reference is to be had to the Figures in which identical reference numbers identify similar components. The drawing figures are not necessarily to scale and certain features are shown in schematic or diagrammatic form in the interest of clarity and conciseness.

In accordance with one embodiment of the present invention and as shown generally in Figures, there is a provided a system 10 to measure the installation torque T of a screw pile 12 which generally comprises at least one load cell 14 having at least one sensor 16 for detecting the load, force or strain on the cell 14. Preferably, load cell 14 is in the form of a pin and is placed or positioned, within the machinery used to drive the screw pile 12 into the ground so that all, or substantially all, of the installation torque T is transmitted through said at least one sensor 16 so as to measure that installation torque. Load cell 14 will also be referred to as load pin 14 when discussing a preferred embodiment of the invention. The machinery used to drive the screw pile 12 into the ground may be a skidsteer loader, excavator or some other suitable machinery.

Figure 2A:
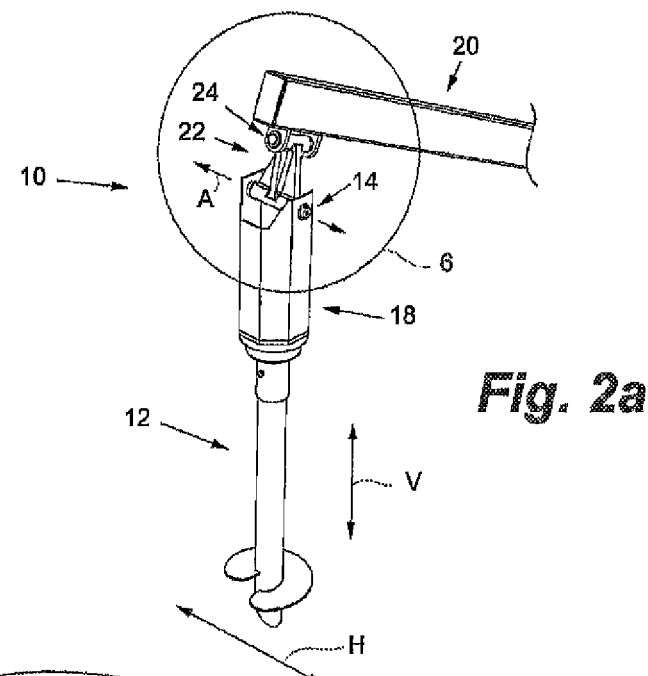
FIG. 2a is a perspective view of one embodiment of the load cell according to the present invention, shown mounted in a universal joint coupler suspended between a boom and a rotary drive.
Figure 2B:
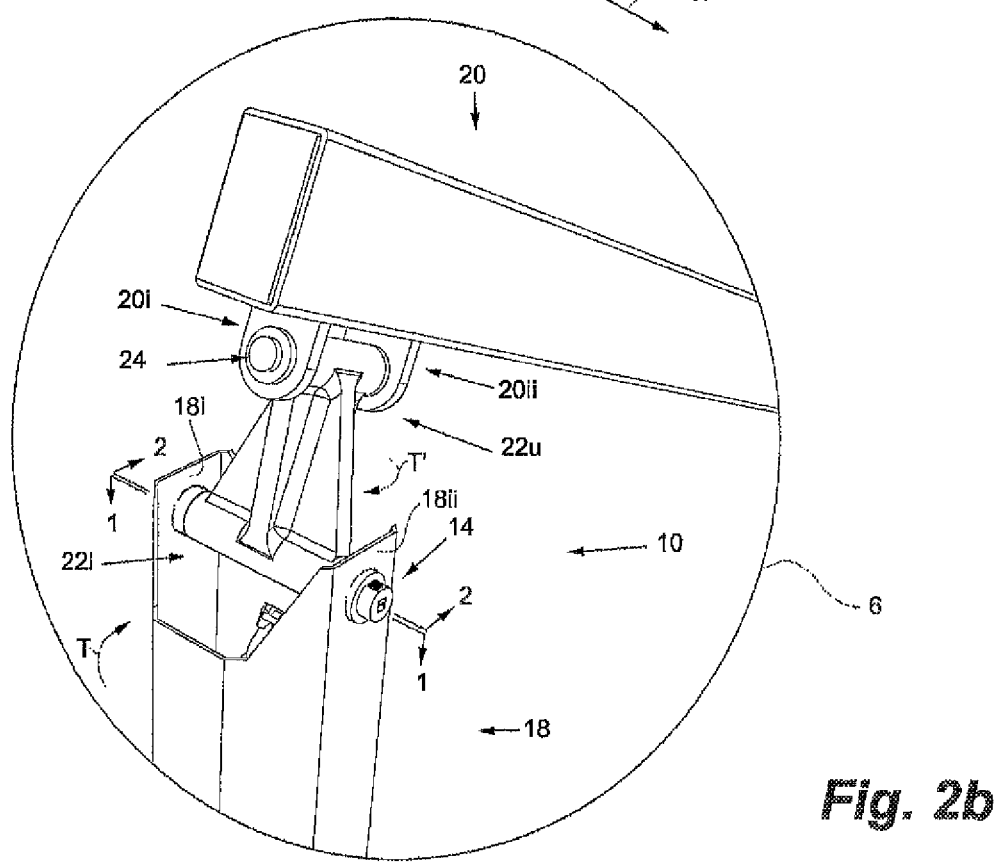

In one embodiment, the machinery used to drive the screw pile 12 into the ground comprises a suitable rotary drive 18 suspended from a boom 20 by means of a universal joint 22 (see FIG. 2a). The rotary drive 18 can be of the type disclosed in U.S. Pat. No. 6,942,430, the disclosures of which are hereby incorporated by reference, or of some other conventional rotary drive.

In one embodiment, the rotary drive 18 is shown suspended from the boom 20 by a universal joint-type coupler 22 having an upper section 22u and a lower section 22l. Preferably, coupler's upper section 22u is pivotally connected to the boom 20 between two ears 20i, 20ii (having through bores) via pivot pin member 24 in a conventional manner. In one embodiment, the rotary drive 18 is pivotally suspended from the coupler's lower section 22l, via ears 18i, 18ii whereby load pin 14 is mounted through an axial passage 22a in the coupler's lower section 22l and through bores 18a and 18b provided in each of said ears 18i, 18ii. Preferably, and as is conventional in a universal joint-type coupler, pins 14 and 24 have their pivot axis oriented at 90° relative to each other. Wear sleeves, wear members, bushings or bearings 19a, 19b may be provided between load pin 14 and through bores 18a, 18b to facilitate pivotal movement of the rotary drive 18 with the coupler 22. Likewise, wear sleeves, wear members, bushings or bearings may be provided between pivot pin 24 and through-bores in ears 20i, 20ii.

Figure 3A:
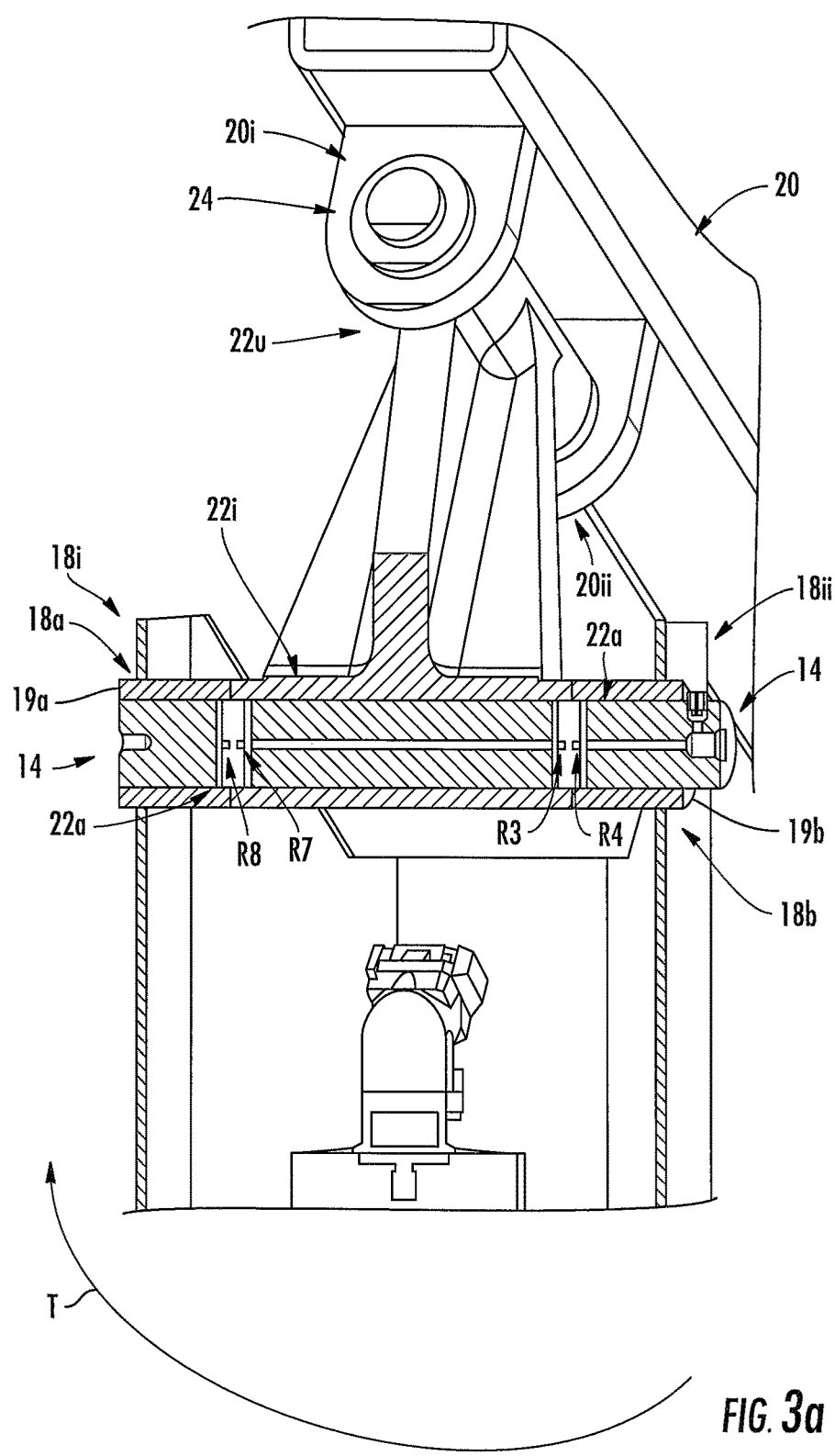
FIG. 3a is a sectioned perspective view of the load cell of the embodiment of FIG. 2a, shown mounted in a universal joint and taken along line 2-2 in FIG. 2b.
Figure 3B:
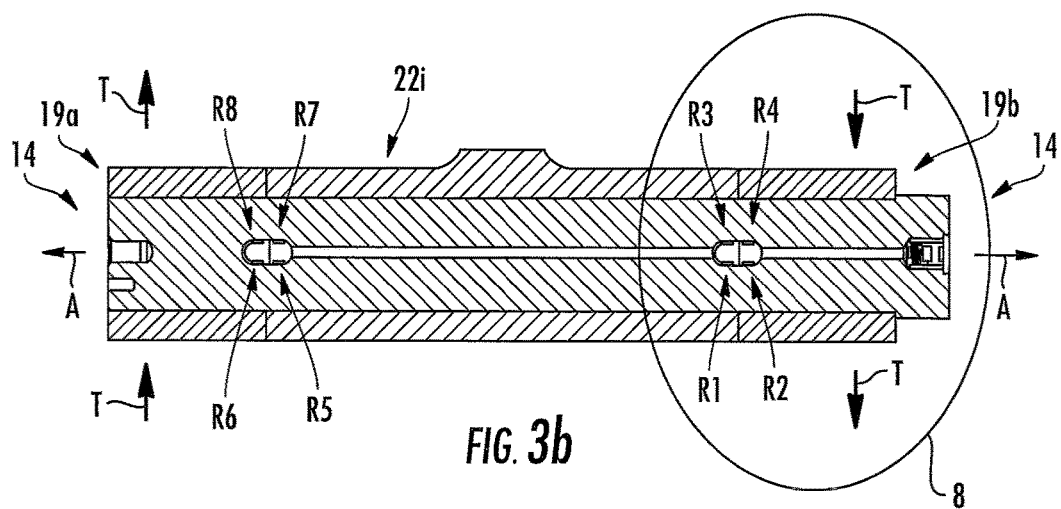
FIG. 3b is a sectioned perspective view of the load cell of the embodiment of FIG. 2a, shown mounted in a universal joint and taken along line 1-1 in FIG. 2b.

In accordance with normal practice, the tolerances between the parts are selected to prevent binding, to allow the desired pivotal movement and to permit easy assembly and disassembly. As such, load pin 14 functions as a pivot pin to pivotally connect the rotary drive 18 to coupler's lower section 22l. Preferably lower section 22l has its pivot axis oriented at 90° to the pivot axis of the upper section 22u with the boom 20, as is customary in a universal joint. In one embodiment, load pin 14 is mounted through the coupler's lower section 22l so that the majority of the axial body 14a is covered or enveloped by the coupler's lower section 22l and/or the bushings 19a, 19b, with only the ends 14e, 14f extending out of the coupler's lower section 22l and the through bores 18a, 18b (see FIG. 3a, for example).

In this embodiment, all or substantially all of the installation torque T is transmitted from the rotary drive 18 (as applied to the screw pile 12 during installation) through the coupler 22 and to boom 20. By virtue of the load pin 14 being used as one of the pivot pins in the universal joint-type coupler 22, some or all of the installation torque T is also transmitted through said pin 14 and detectable or measurable by said at least one sensor 16.

In an alternate embodiment (not shown), load pin may be mounted in the connection between the upper section 22u and the boom 20 in place of pivot pin 24 and a conventional pivot pin may then be used to pivotally connect the rotary drive 18 to the lower section 22. In yet a further alternate embodiments (also not shown), the rotary drive 18 is suspended from the boom 20 by only a single pivoting joint (e.g. such as that shown in FIG. 1a) and then load pin 14 will be used as the pivot pin at such single pivoting connection.

Description of the Load Cell

In one embodiment, and referring now to FIG. 6a, load pin 14 is an elongate cylindrical member having an axial body 14a with longitudinal axis A extending between opposing ends 14e, 14f, preferably formed as one part and in one solid piece. Axial body 14a has a medial portion 14m, having a center point CM along longitudinal axis A, and two peripheral portions 14p, 14p'. Medial portion 14m is adapted to mount through the axial passage 22a of the coupler's lower section 22l. The peripheral portions 14p, 14p' are adapted to mount through bores 18a, 18b and any wear members 19a, 19b that may be provided.

Between the medial portion 14m and the two peripheral portions 14p, 14p', the axial body 14a has transitional portions 15a, 15b of a slightly smaller outside diameter than the medial 14m and peripheral portions 14p, 14p' so as to allow some movement and/or bending of the load pin 14 at these portions 15a, 15b when installed in a coupler 22 and when subjected to installation torque T.

Figure 3C:
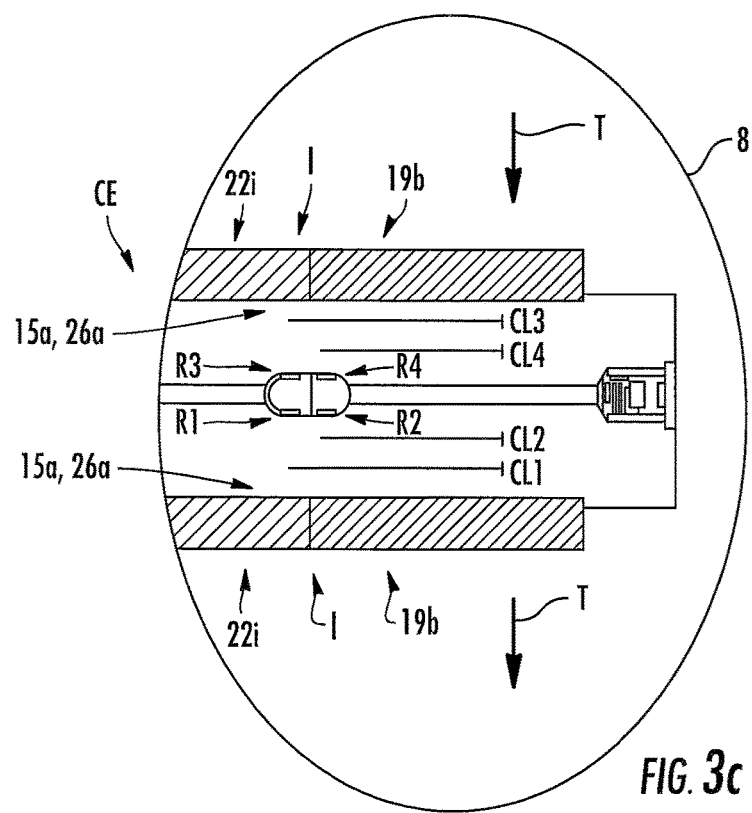
FIG. 3c is an enlarged view of the embodiment of FIG. 2a, taken of area 8 in FIG. 3b and schematically illustrating a cantilever effect for each of the four strain gauge sensors in area 8.

Preferably, the transitional portions 15a, 15b function as force measuring zones 26a, 26b, each having at least one sensor 16 arranged or mounted somewhere therein. In one embodiment, transitional portions 15a, 15b are between 1 cm and 5 cm in width (i.e. width/spacing between medial and peripheral portions), which allows for sufficient movement and/or bending of the load pin (to allow the at least one sensor 16 function properly) while not weakening the load pin unnecessarily and still allow it to safely function as a pivot pin within a coupler 22. In one embodiment, transitional portions 15a, 15b are positioned along the load pin's longitudinal axis A so that they are substantially centered along the interface I of the coupler's lower section 22l and the respective wear members 19a, 19b, so that a maximum amount of shear force (between the load pin portion within the coupler's lower section 22l and the load pin portion that is within the through bores 18a, 18b and any wear members 19a, 19b) can be directed into said transitional portions 15a, 15b and said force measuring zones 26a, 26b (see FIG. 3c). However, the system 10 will work effectively as long as said interface I is positioned at any point along the transitional portions 15a, 15b. In one embodiment, the transitional portions 15a, 15b are the same distance from the center point CM and are substantially mirror images of each other.

In one embodiment, the system 10 comprises a plurality of sensors 16 mounted on the interior of one or more bores or holes 28a, 28b, in said one or more of the transitional portions 15a, 15b and said force measuring zones 26a, 26b. In the preferred embodiment, bores 28a and 28b are equidistant from the center point CM of the medial portion 14m and are mirror images of each other.

Preferably, load pin 14 is provided with an internal passage 30 that connects bores 28a, 28b to each other and, more preferably, extends to at least one end (e.g. end 14e) of the load pin 14. Axial passage 30 is preferably coaxial with the longitudinal axis A, but it need not be. Advantageously, electrical conductors (not shown) can be run through axial passage 30, e.g. between the bores 28a, 28b and out toward one of the ends 14e of the load pin 14, so as to facilitate electrical connection of, and signal transfer from, the at least one sensor 16 to an external display, signal amplifier or recorder (not shown) and/or electrical connection of a plurality of sensors 16 to each other and/or to an external display, signal amplifier or recorder.

In one embodiment, axial passage 30 near the end 14e may be enlarged at said end 14e, so as to accommodate additional electrical circuitry, such as a printed circuit board assembly 32, to assist with sensor signal processing, amplification and/or transmission of the sensor signals to the external display or recorder. In one embodiment, printed circuit board assembly 32 is provided with a conventional level sensor or accelerometer (not shown), to provide sensory data regarding the amount of tilt or displacement (if any) of the load pin's longitudinal axis A relative to the horizontal plane H. In one embodiment, axial passage 30 near end 14e exits at said end 14e, such as along the longitudinal axis A at position 14i, or at a perpendicular angle to the longitudinal axis, such as at position 14j, or at both. In one embodiment, a wiring connector or socket 34 is provided to facilitate a removable electrical signal connection between the at least one sensor 16 and any external display, signal amplifier or recorder and to sealable close passage 30; and a cap 36 is provided to sealable close passage 30 at 14i once printed circuit board assembly 32 is installed within enlarged end of passage 30.

Description of the Bores

Bores 28a, 28b may be blind ended, but preferably bores 28a, 28b are through-bores (i.e. going fully through the load pin 14) with each having a bore axis B, B' arranged in a radial fashion and being substantially perpendicular to the longitudinal axis A of the load pin 14. Advantageously, through-bores 28a, 28b provide for easy of assembly and mounting of the sensors 16 within the load pin 14 (e.g. by being able to manipulate and access the sensors 16 from either of two sides of the load pin 14 at either openings to bores 28a, 28b or by being able to pull sensor wiring therethrough from one side to the other). More advantageously, sensors 16 are protected (from weather, contamination and physical damage) by virtue of being mounted on the interior of load pin 14 in the bores 28a, 28b and, then, by virtue of the load pin being installed within (and substantially covered by) axial passage 22a of the coupler's lower section 22l.

Preferably, one or more substantially flattened or planar regions 28a', 28a", 28b', 28b" are provide on the interior surface of bores 28a, 28b, with said planar regions being of sufficient surface area to mount the at least one sensor 16 (e.g. as shown in FIG. 8). In one embodiment, each of bore 28a, 28b is provided with two planar regions in a paired arrangement (e.g. 28a', 28a" for bore 28a, and 28b', 28b" for bore 28b), wherein said two planar regions in each bore are substantially parallel to, but on either side of, a central plane CP of the load pin 14 (which runs along the longitudinal axis A). In one embodiment, the two planar regions in each bore are equidistant from the central plane CP (see, for example, FIGS. 8 and 9b).

Advantageously, the planar regions 28a', 28a", 28b', 28b" make for an easier mounting surface, for the at least one sensor 16, as compared to the curved surface of a conventional through-bore. Preferably, the planar regions 28a', 28a", 28b', 28b" have a width ranging between 0.75 inches to 2 inches, so as to accommodate a pair of sensors 16 mounted side-by-side on each of said planar regions (see, paired R1, R2 and paired R5, R6 on planar regions 28a and 28b' in FIG. 6a, for example). In the preferred embodiment, the planar regions 28a', 28a", 28b', 28b" have a width of approximately 1 inch. Moreover, a jig (not shown) comprised of a simple flatten bar or metal strip, of just under 1 inch wide, and having cut outs for the sensors 16, can be utilized to position paired sensors inside a bore (e.g. 28a) in a consistent manner and placement across multiple load pins 14 that may be manufactured; e.g. by sliding such jig along a planar section (e.g. along 28a') to a predetermined point and then gluing or mounting the paired sensors 16.

Description of the Pockets

The invention is generally described herein as having bores 28a, 28b. As shown in FIGS. 13-16, however, some embodiments use pockets 38a, 38b, 38c, 38d instead of bores 28a, 28b. It should be noted that pockets may be used in place of bores for any of the embodiments described herein. In these embodiments the pin 14 includes one or more pockets 38a, 38b, 38c, 38d, each of which is adapted to receive a sensor 16 (or part of a sensor). The pockets are milled, drilled, or otherwise created below the outer surface of the pin 14 a predetermined distance and are preferably centered within their respective force measuring zone. The embodiments shown include four pockets 38a, 38b, 38c, 38d with pockets 38a and 38b being generally the same distance from the longitudinal center of the pin 14 and substantially mirror images of each other relative to a vertical plane that passes through the center point CP. Pockets 38a and 38c are generally mirror images of each other relative to a horizontal center plane. As used herein, pockets 38a and 38b are on the same "side" but are on opposite "ends".

Although the embodiment shown comprises four pockets 38a, 38b, 38c, 38d, other embodiments may have other numbers of pockets. Some embodiments include a single pocket 38a with an entire sensor 16 mounted therein. Other embodiments include two or more pockets on the same side of the pin 14 such as pockets 38c and 38d with a sensor 16 (or part of a sensor 16) mounted in each pocket 38c, 38d. Still other embodiments include two or more pockets on opposite sides and opposite ends of the pin 14 such as pockets 38a and 38d with a sensor 16 (or part of a sensor 16) mounted in each pocket 38a, 38d. It is preferable, however, to have the pockets paired on opposite sides of the same end such as pockets 38a and 38c so they are opposing (mirror images) about a horizontal axis. This configuration is preferred because the symmetry allows for easier cancellation of downward forces since errors in pocket 38a are opposite to downward forces in opposing pocket 38c thereby allowing the forces to cancel each other and provide a more accurate calculation of torque T. It is even more preferably to have multiple mirror image groups of two on opposite sides of the same end such as mirror image pocket pairs 38a/38c and 38b/38d shown in the figures.

The pockets 28 are not through-bores (i.e. they do not go fully through the load pin 14). Instead, the pockets terminate a predetermined distance below the surface of the pin 14. This allows sensors 16 to be mounted within the pockets without compromising the strength of the pin 14. In some embodiments the pockets extend between about one eighth (⅛) and one quarter (¼) of the way through the diameter of the pin 14. A shallower pocket may be required if the pin needs to be stronger. In one embodiment the minimum depth of each pocket is about 0.188 inches (3/16 of an inch) in order to ensure the strain gauges and wires are situated in the pocket without protruding therefrom. A clear adhesive (or other suitable cover) may be used to cover and protect the strain gauges and wires in the pocket.

Figure 14:
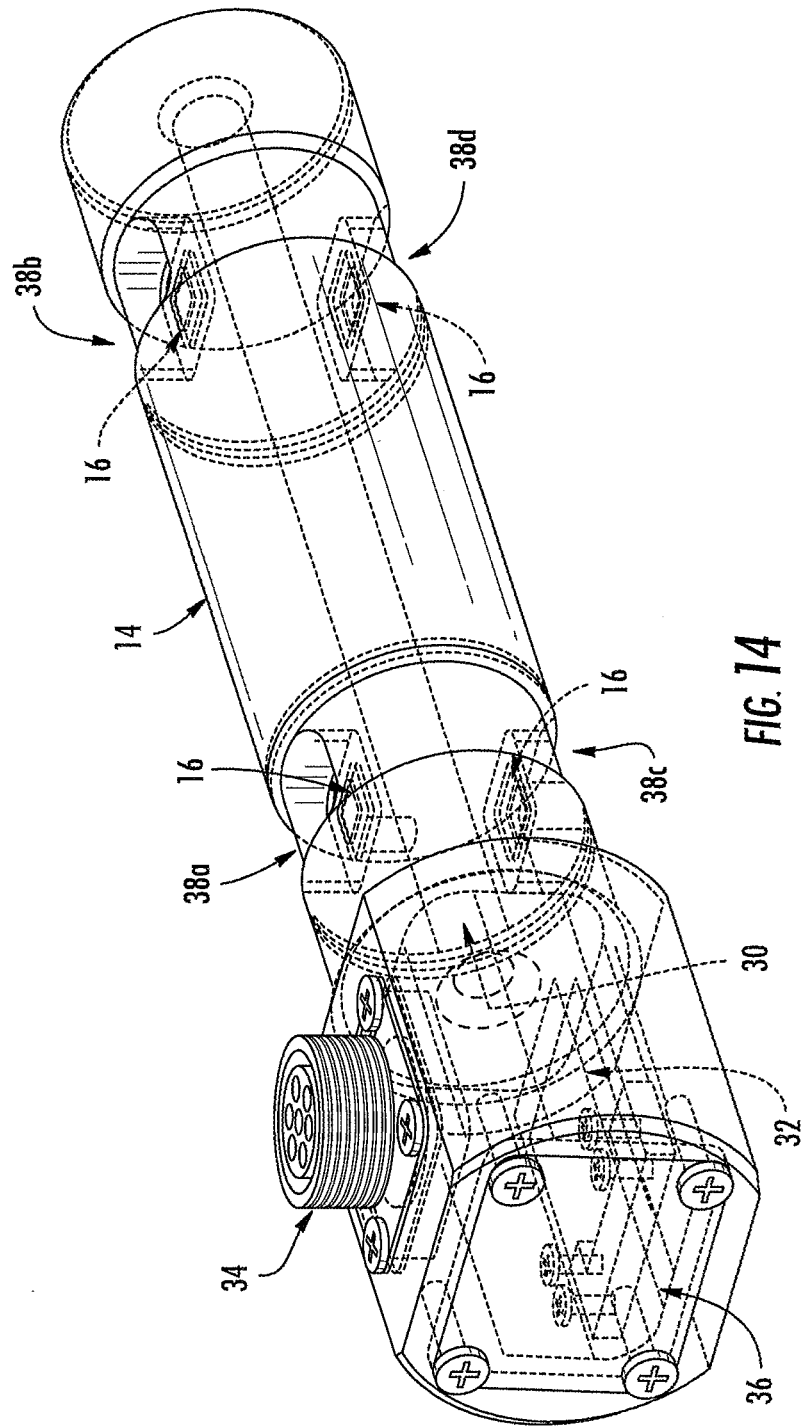
FIG. 14 is a perspective view of an embodiment of the load cell similar to FIG. 13, showing some of the internal structure in phantom lines.
Figure 15:
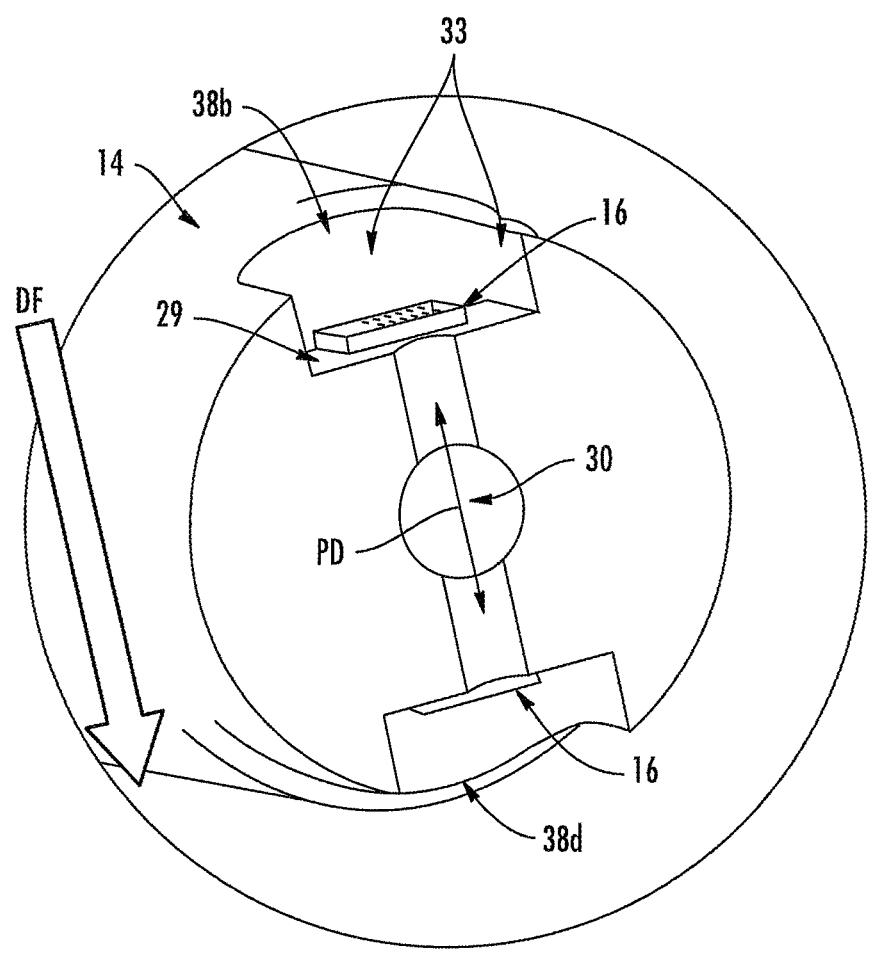
FIG. 15 is a sectioned perspective view of an embodiment of the load cell, taken along line 3-3 in FIG. 13.
Figure 16:
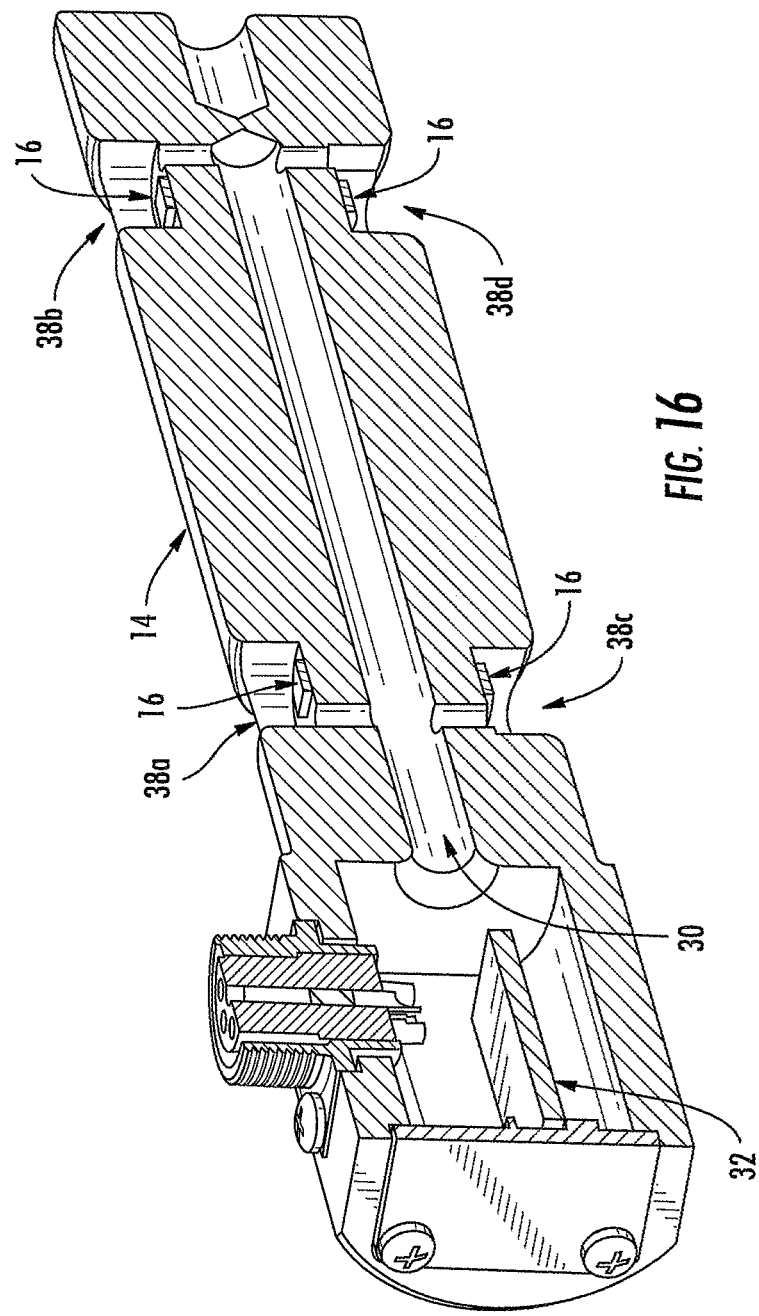
FIG. 16 is another sectioned perspective view of an embodiment of the load cell.

As shown best in FIGS. 14, 15, and 16, the pockets 38a, 38b, 38c, 38d preferably comprise a floor portion 29 and one or more wall portions 33. Collectively, the floor 29 and walls 33 are referred to herein as the "inner surface" or "web" of the pocket. In one embodiment, the floor portion 29 sits in a plane that is generally horizontal (when the pin 14 is aligned in its normal orientation described below) and parallel with the longitudinal axis A of the pin 14. In one embodiment the one or more wall portions 33 are generally perpendicular to the floor portion 29 and extend outwardly (away from the center of the pin 14). In some embodiments the floor portion 29 may be in a plane other than horizontal and the walls 33 may be in a plane other than vertical, however, these alternate embodiments make it more difficult to align the sensor 16.

The sensors 16 are mounted to a portion of the web and are preferably mounted in the center of their respective pocket. In one embodiment, the floor 29 of each pocket 38a, 38b, 38c, 38d provides sufficient surface area to mount the at least one sensor 16 (e.g. as shown in FIG. 16). In one embodiment, the surface area of the floor portion 29 is between two and five times larger than the exposed surface of the sensor 16 to allow for easy placement of the sensor to the floor 29. It is preferable to mount the sensor 16 to the generally horizontal floor portion 29 to measure torque T for the reasons discussed below. In another embodiment, the walls 33 of each pocket 38a, 38b, 38c, 38d provide sufficient surface area to mount the at least one sensor 16. As will become apparent from the description of the sensors 16 (below), the sensors 16 are preferably mounted to the walls 33 for measuring downward force DF instead of torque T, however, sensors 16 may be mounted to the walls 33 for measuring torque T in some embodiments. The large generally planer surfaces of the floor 29 and side wall(s) 33 make it easy to install the sensors 16 without needing a jig or other placement tool.

Description of the at Least One Sensor

Preferably, the at least one sensor 16 is a transducer such as a foil strain gauge, glued or otherwise mounted to the inner surface of the one or more bores or holes 28a, 28b. Foil strain gauges are well known in the art as sensors to transduce deformation (due to application of force) into electrical resistance change. In particular, as the interior of the bores 28a, 28b (and the planar regions 28a', 28a", 28b', 28b") are deformed, any foil strain gauges mounted thereon are also deformed, causing the strain gauge's electrical resistance to change. Conventional electronic network circuitry and measurement calculations can then be utilized to translate output from the at least one sensor 16 into corresponding force measurements, such as torque T.

Referring to FIG. 7b, typical strain gauges 16,R1,R2 are shown arranged as a long, thin conductive strip in a zig-zag pattern of parallel lines such that a small amount of stress in the direction of the orientation of the parallel lines PL results in a multiplicatively larger strain over the effective length of the conductor and, moreover, results in the strain gauge being far more sensitive to strain and forces in the orientation of the parallel lines PL than in the direction that is substantially perpendicular to the orientation of parallel lines PL (said substantially perpendicular direction indicated by arrow labelled PD and being mostly insensitive to strain).

In a preferred embodiment, the load pin 14 comprises eight foil strain gauge sensors 16, identified as R1, R2, R3, R4, R4, R6, R7 and R8, with R1 to R4 being mounted within bore 28a and R5 to R8 mounted within bore 28b. Preferably, all the strain gauge sensors 16, R1-R8 are mounted within their respective bores 28a, 28b of the load pin 14 so that the orientation of their parallel lines PL are substantially parallel to the load pin's longitudinal axis A the central plane CP of the load pin 14, and substantially perpendicular to their respective bore axis B or B' (see FIGS. 7b, 8).

In one embodiment, each set of four foil strain gauge sensors 16 is arranged within their respective bore 28a, 28b so that two of the gauges in each bore are in a first (same) plane on one side of the load pin's central plane CP and substantially parallel to the longitudinal axis A (e.g. see FIG. 7b), while the other two gauges are in a second plane on the other side of the load pin's central plane CP and are also substantially parallel to the longitudinal axis A; see FIG. 8 where R1 and R2 are on one side of the longitudinal axis A in a plane that corresponds substantially with planar region 28a', while R3 and R4 are on the other side of the longitudinal axis in a plane that corresponds substantially with planar region 28a". A corresponding arrangement applies for R5 to R8, as also shown in the figures. Preferably, the plane of one set of paired sensor gauges 16 (e.g. planar region 28a' having R1 and R2) is equidistance from the central plane CP as compared to the plane of the other set of paired sensor gauges (e.g. planar region 28a" having R3 and R4). In one embodiment, the spacing SP between each sensor 16 in a set of paired sensor gauges 16 (e.g. between R1 and R2) is the same and consistent as compared to the spacing SP between the sensors 16 in all the other paired sensor gauges 16 in the system 10 (e.g. between R3 and R4). In one embodiment, the arrangement of sensors 16 in the other bore (e.g. R5-R8 in bore 28b) is a mirror image of the arrangement of the sensors 16, R1-R4 in the first bore 28a. Preferably, a flat bar type of jig, as noted above, may be utilized to obtain such consistent spacing SP between paired sensors within a single load pin 14 and across multiple load pins during manufacturing.

In a preferred embodiment, such spacing SP between sensors in a set of paired sensor gauges is in the range of 0.5 to 0.625 inches, center-to-center of adjacent sensors (see FIG. 7b for example). However, a closer spacing SP of paired sensor gauges 16, such as ¼ inch center-to-center, will also work but may result in slightly lower sensory output when the sensors are arranged in a network bridge circuit (as further explained below). Likewise, a further or wider spacing SP of paired sensor gauges 16, such as 1.5 inch center-to-center spacing, will again work and may even provide greater signal output when using the electronic bridge circuitry as described below. However, such further (wider) spacing will require wider bores 28a, 28b which may weaken the load pin 14 so that it become unsuitable as a pivot pin to pivotally connect the rotary drive 18 to coupler's lower section 221 and/or is more sensitive to unexpected and inconsistent stress and shear errors which may be picked up and/or amplified by such wider-spaced sensors 16.

Description of Load Pin Installation within Coupler

Figure 4:
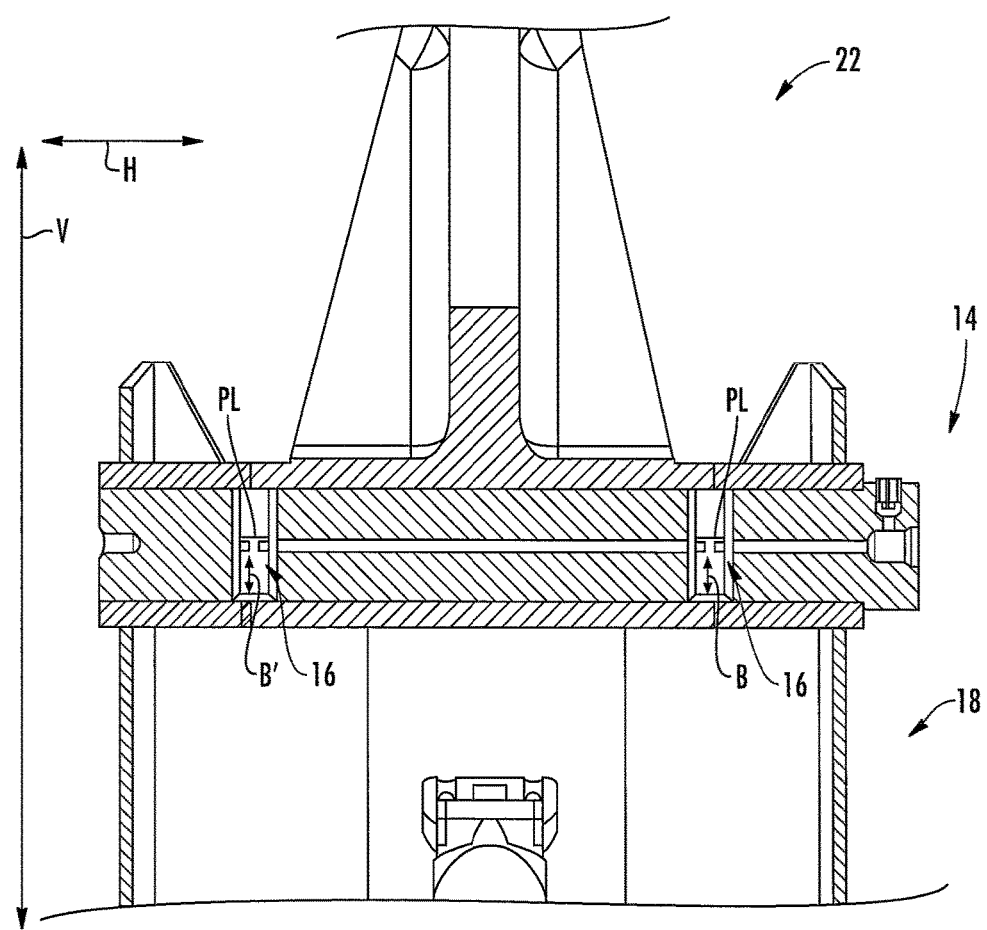
FIG. 4 is another sectioned perspective view of the load cell of the embodiment of FIG. 2a, shown mounted in a universal joint and taken along line 2-2 in FIG. 2b.

Preferably, when the load pin 14 is placed within a coupler 22, wherein its longitudinal axis A will be oriented substantially parallel to the horizontal plane H (see FIGS. 2a, 4), and wherein the load pin 14 is rotated or mounted so that bores 28a, 28b (and their bore axis B, B' and their planar regions 28a', 28a", 28b', 28b") are oriented substantially parallel to the vertical plane V and, hence, also substantially parallel to the axis of rotation of the screw pile 12, which is generally driven into the ground in vertical manner (see FIGS. 2a, 4). Advantageous, when foil strain gauges are utilized as the sensor 16 the parallel lines PL thereof are then substantially parallel to horizontal H and, therefore, the much less sensitive orientation of the foil strain gauge sensor 16 (direction PD) is substantially parallel to vertical V. Advantageously, any torque T imparted to the screw pile 12 by the rotary drive 18 will be applied in a perpendicular manner to said bore axis B, B' and planar regions 28a, 28a', 28b, 28b' (see, for example, FIGS. 6a and 6b) and can be picked-up, or sensed, by the at least one sensor 16 via the much more sensitive parallel lines PL. More advantageously, any downward force DF is directed through the sensors 16 along the much less sensitive direction PD and therefore will not be picked up by overall sensing system and/or the system 10 will overall be less affected by such downward force DF. Preferably, the orientation of the bore axis B, B' does not deviate more than 7 to 10 degrees (plus or minus) from being parallel to the vertical plane V.

In contrast, and as will now be appreciated by those skilled-in-the art, if the orientation of the bore axis B, B' is further deviated and is substantially parallel to the horizontal plane H, them (a) any torque T imparted to the screw pile 12 by the rotary drive 18 will be applied in a parallel manner to said bore axis B, B' and will be sensed by the at least one sensor 16 via the much less sensitive direction PD and (b) any downward force DF is directed through the sensors 16 along the much more sensitive parallel lines PL. Such an orientation of the load pin 14 within the coupler 22 would, therefore, not be desirable and would likely create unknown and unexpected errors; or require significant calibration of the load pin 14 to compensate for such errors and/or unknowns.

Preferably, the load pin 14, once mounted within the coupler 22 is the desired orientation, is locked in place using a conventional end-cap (not shown) that may be attached to end 14f. Alternatively, the load pin 14 may be locked in place (in the desired orientation) via welding, keyed members, cross-pins, locking pins or other conventional means.

Connection of Sensors within Each Bore

Figure 10A:
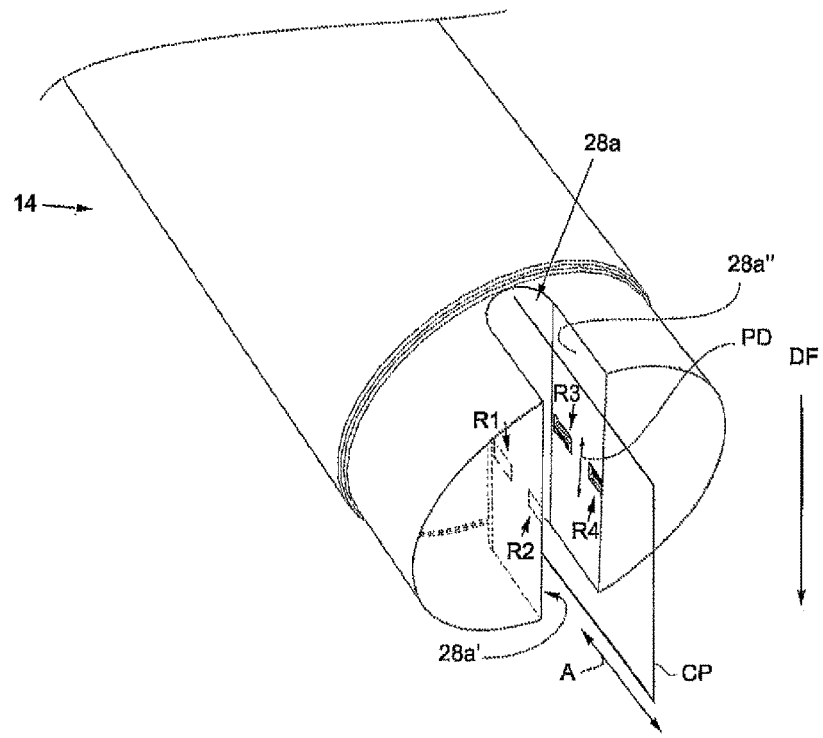
FIG. 10a is another sectioned perspective view of the load cell of the embodiment of FIG. 2a, taken along line 7-7 in FIG. 5a, wherein end of the load cell is being subjected to a 5000 lb downward force while it is installed in a coupler of a preferred system embodiment.
Figure 10B:
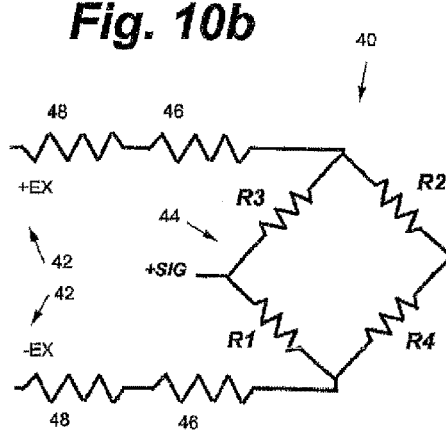
FIG. 10b is an electrical schematics of how a Wheatstone bridge network electrically connects a preferred embodiment of four strain gauges and illustrating one example of an output signal (voltage) generated by the stresses on the load cell of FIG. 10a as it experienced the 5000 lb downward force.

Although not preferred, the sets of strain gauges in each bore (e.g. R1-R4 in bore 28a and R5-R8 in bore 28b) may each be electrically interconnected using a conventional Wheatstone bridge electronic circuit or network 40; see, for example, FIGS. 10b and 11b illustrating how one set of strain gauges R1-R4 in bore 28a may be interconnected in a Wheatstone bridge fashion (strain gauges R5-R8 in bore 28b then likewise being interconnected using a second similar Wheatstone bridge network). In particular, in this Wheatstone bridge fashion, one branch or leg of the bridge circuit 40 is comprised of two foil strain gauges 16 (which act as the resistors within the bridge circuit) that are mounted on opposing planar regions within a particular bore (e.g. R1 on planar region 28a' and R3 on opposing planar region 28a" form the left branch of the circuit; see FIGS. 10a and 10b). The other branch or leg of the bridge circuit 40 is likewise comprised of the two remaining foil strain gauges 16 that are also on opposing planar regions, relative to each other (e.g. R2 on planar region 28a' and R4 on opposing planar region 28a" form the right branch of the circuit; see FIGS. 10a and 10b).

Figure 10C:
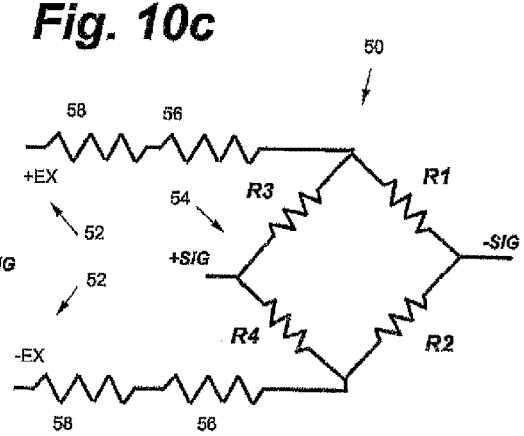
FIG. 10c is an electrical schematics of a differential bridge network employed by the invention to electrically connect a preferred embodiment of four strain gauges and illustrating one example of an output signal (voltage) generated by the stresses on the load cell of FIG. 10a as it experienced the 5000 lb downward force.

The Wheatstone bridge network 40 is energized by a suitable source of electric potential 42 and may have additional electronics such as temperature compensation resistors 46 and calibration resistors 48 as is conventional with such bridge circuits. Using conventional foil strain gauges, when no force is applied to the load pin 14, the sensors 16, R1-R8 remain at their normal resistance values (e.g. at 350Ω (ohms)), the bridge circuit is balanced and the signal voltage (Vsig) is therefore at zero. However, when a force is applied (e.g. a 5000 lb downward force DF as in FIGS. 10a-10c; or a 5000 lb torque force as in FIGS. 11a-11c) any unbalance in flow of electric current through the strain gauges R1-R4 of the network circuit 40 creates a measurable signal 44 that may be measured, recorded or amplified by an external display, signal amplifier or recorder (not shown) in a conventional manner to determine and calculate the amount of force or torque T applied.

Although a Wheatstone bridge network 40 will be responsive to, and can be used to measure, installation torque T and provide a measurable signal 44 relating thereto, there are some disadvantages to using a Wheatstone bridge network 40. In particular, the inventor has observed that such a Wheatstone bridge network 40 (as used with the preferred embodiment a set of four foil strain gauges within one of the two bores) is still somewhat sensitive to downward forces DF, even if the downward force DF is directed through the sensors 16 along the much less sensitive direction PD.

Therefore, in a preferred embodiment a set of four foil strain gauges within a bore (e.g. R1-R4 in bore 28a) is electrically interconnected using a differential bridge electronic circuit or network 50. In particular, in this differential bridge fashion, one branch or leg of the bridge circuit 50 is comprised of two foil strain gauges 16 (which act as the resistors within the bridge circuit) that are mounted on the same planar region within a particular bore (e.g. R3 and R4, both on planar region 28a" form the left branch of the circuit; see FIGS. 10a and 10c). The other branch or leg of the differential bridge circuit 50 is comprised of the two remaining foil strain gauges 16 that are on the opposing planar region as compared to the first two foil gauges which make up the first branch of the circuit (e.g. R1 and R2 on planar region 28a' form the right branch of the circuit; see FIGS. 10a and 10c).

The differential bridge network 50 is energized by a suitable source of electric potential 52 and may have additional electronics such as temperature control resistors 56 and calibration resistors 58 as is conventional with such bridge circuits. When no force is applied to the load pin 14, the sensors 16, R1-R8 remain at their normal resistance values (e.g. at 350Ω (ohms)), the bridge circuit is balanced and the signal voltage 54 (Vsig) is therefore at zero. However, when a force is applied any unbalance in flow of electric current through the strain gauges R1-R4 of the network 50 creates a measurable signal 54 that may be measured, recorded or amplified by an external display, signal amplifier or recorder (not shown) in a conventional manner to determine and calculate the amount of force or torque T applied.

Advantageously, the inventor has observed that a differential bridge network 50 (as used with the preferred embodiment of a load pin 14 having at least one set of four foil strain gauges within a bore and said pin 14 being oriented within coupler as described above in the preferred orientation) is much less sensitive to any downward forces DF than using a Wheatstone bridge network 40.

Preferably, during manufacturing or afterwards, the particular electronic bridge network 40 or 50 of a particular load pin 14 is calibrated using a test bed or similar calibration machine, and using conventional calibration techniques.

Example #1—Bores

Figure 12A:
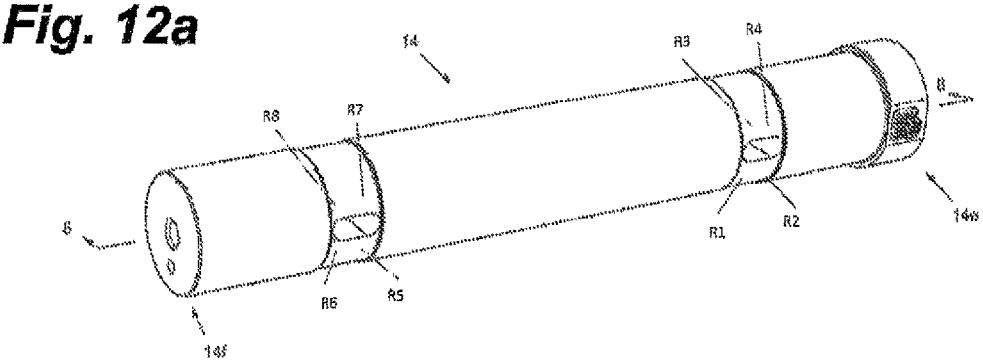
FIG. 12a is a perspective view of the load cell of the embodiment of FIG. 2a, showing a preferred layout of eight foil strain gauge sensors arranged within a pair of through-bores.
Figure 12B:
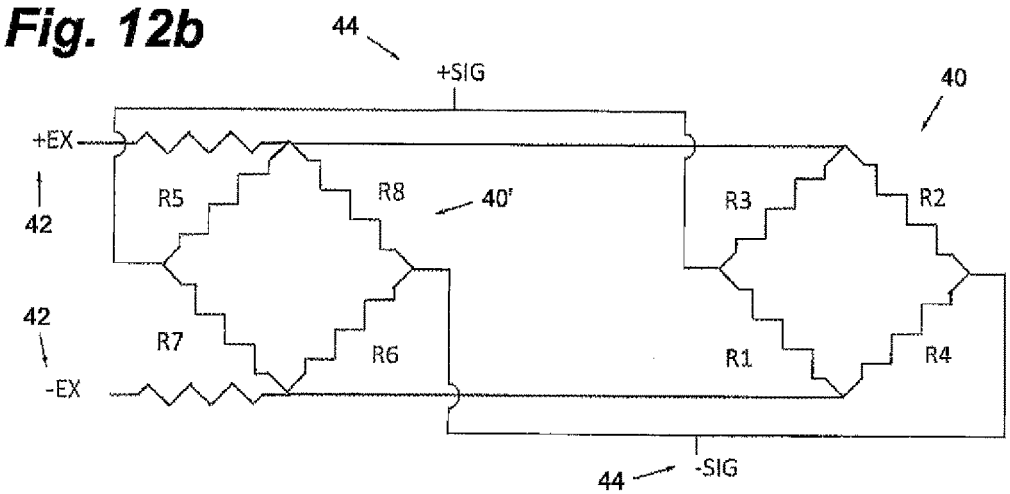
Figure 12C:
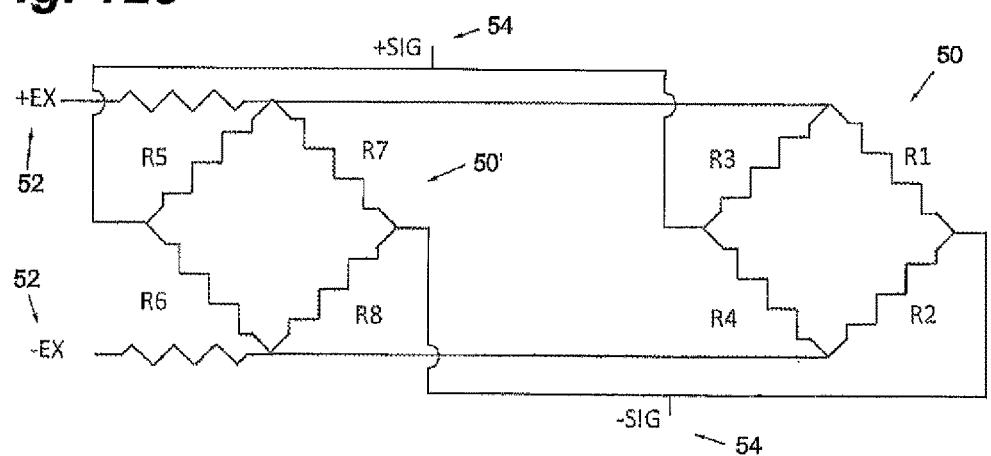
Figure 13:
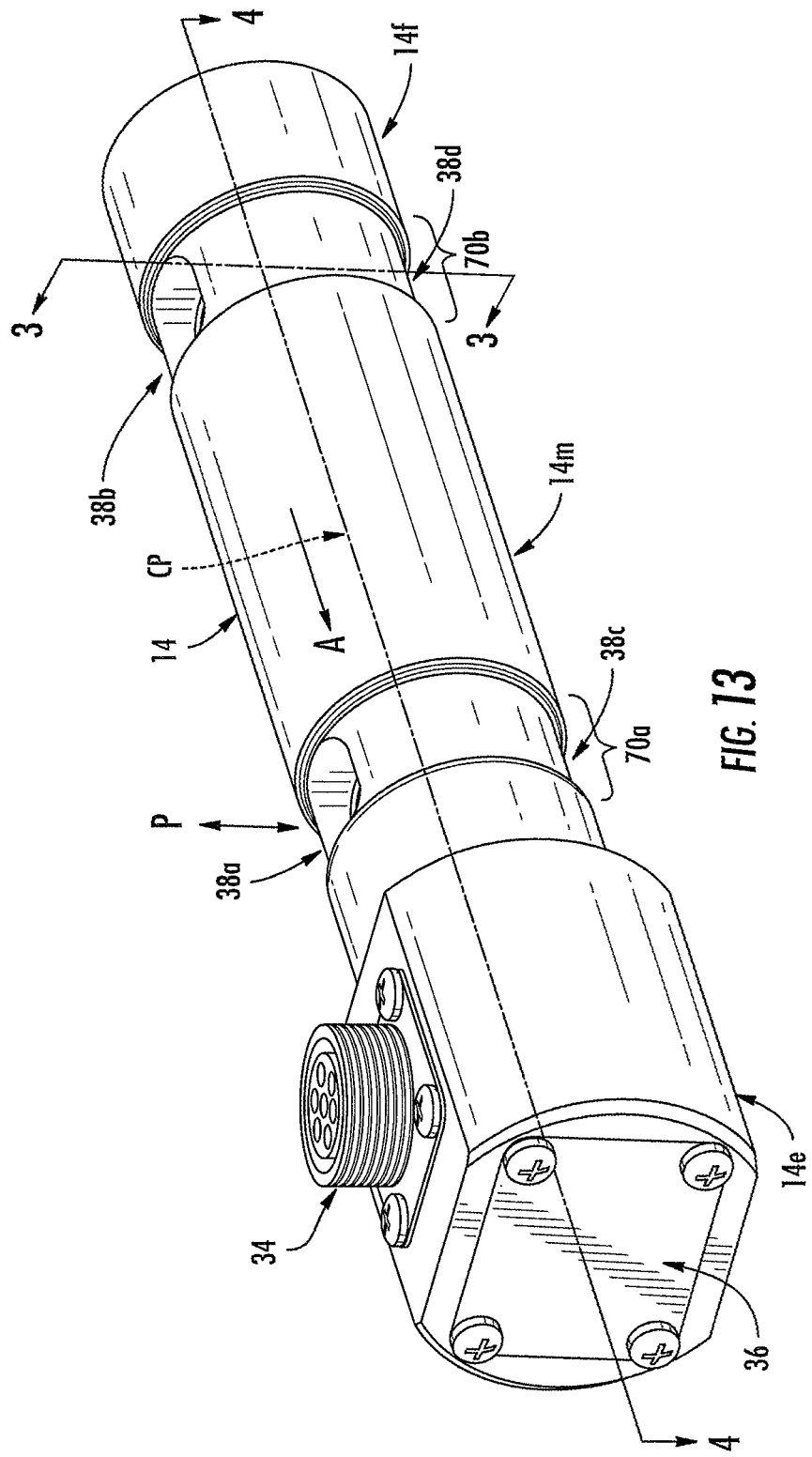
FIG. 13 is a perspective views of an embodiment of the load cell having pockets instead of bores.

Now referring to FIGS. 12a-12c, the eight foil strain gauges in each bore (e.g. R1-R4 in bore 28a and R5-R8 in bore 28b) of the preferred embodiment are may be electrically interconnected to provide a single measurable signal 44, 54 using either a pair of connected Wheatstone bridge electronic networks 40,40' (see FIG. 12b) or a pair of connected differential bridge electronic networks 50,50' (see FIG. 12c).

Using the preferred embodiment of the load pin 14 and oriented in the preferred orientation within the coupler 22, as described herein, and wherein the sensors 16, R1-R8 are conventional foil strain gauges having normal (i.e. no force being applied) resistance values of 350Ω (ohms), each pair of sensors mounted on a planar region (as shown in the Figures) and having a center-to-center spacing of 0.625 inches and where excitation voltage (Vinput, +EX/−EX) is 10 Volts (although the signal voltage change (Vsig) being reported as millivolts-per-volt (mV/V)), and utilizing either a pair of connected Wheatstone bridge electronic networks 40,40' (of the embodiment of FIG. 12b) or a pair of connected differential bridge networks 50,50' (of the embodiment of FIG. 12c), the inventor observed the following signal values (in millivolts/volt) with respect to a 5000 lb force applied to the pin 14, either as downward force DF or as torque T (as noted), as shown in the table below:

|  | Downward Force | Torque Force |
| --- | --- | --- |
| Wheatstone bridge network (40, 40' in FIG. 12b) | −0.02381 mV/V | 0.22631 mV/V |
| Differential bridge network (50, 50' in FIG. 12c) | 0.00106 mV/V | 0.19863 mV/V |

As can be seen, both types of networks (Wheatstone bridge vs differential bridge) provide a similar magnitude of signal in a response to a 5000 lb torque force (i.e. 0.22631 mV/V and 0.19863 mV/V). Therefore, both types of networks 40 or 50 are suitable to detect and measure torque forces T that may be applied to a screw pile 12. Advantageously, however, the differential bridge network provides a significantly lower signal when the load pin 14 is subjected to a downward force than does a Wheatstone bridge network (0.00106 mV/V for differential vs −0.02381 mV/V for Wheatstone). In fact, the observed difference was more than an order of magnitude smaller when using the differential bridge network. Advantageously then, utilizing a load pin 14 of the preferred embodiment as described herein, along with the eight foil strain gauges electrically connected using a paired differential bridge network 50, 50', results in a system 10 capable of providing a signal representative of the installation torque T of a screw pile 12 while being unaffected (or only very minimally affected) by any downward forces DF.

More advantageously, the inventor has observed that such preferred embodiment, i.e. wherein the through-bores 28a, 28b are equidistant from the center point CM of the medial portion 14m, wherein each of bores 28a, 28b is provided with two planar regions in a paired arrangement, wherein the planar regions in each bore are equidistant from the central plane CP, wherein the arrangement of sensors 16 in one of the bores (e.g. R5-R8 in bore 28b) is a mirror image of the arrangement of the sensors 16, in the other bore (e.g. R1-R4 in bore 28a) and wherein the sensors 16, R1-R8 are connected to generate a signal 54 using a pair of differential bridge networks 50,50', the load pin 14 and the system 10 are insensitive (or only minimally sensitive) to both downward forces DF and to point loading of the pin, such as if the pin 14 is mounted somewhat off-center within the coupler's lower section 22l. Thus the preferred embodiment of the pin 14 and system 10 allows for a non-point source measurement of installation torque T that is not affected by downward forces DF. Moreover, now a conventional hinged member, such as a universal joint or simple pivot connector can be adapted or retro-fit to measure installation torque T and no additional devices are necessary which would otherwise lengthen the screwpile installation machinery (as is the case with the above-noted INTELLI-TORK™ and TORQATRON™ systems).

Example #2—Milled Pockets

Now referring to FIGS. 13-16, the set of four gauges R1-R4 within each pair of pockets 38a, 38c of the preferred embodiment may be electrically interconnected to provide a single measurable signal 44, 54 using either a pair of connected Wheatstone bridge electronic networks 40, 40' (see FIG. 12b) or a pair of connected differential bridge electronic networks 50, 50' (see FIG. 12c).

Using the preferred embodiment of the load pin 14 and oriented in the preferred orientation within the coupler 22, as described herein, and wherein the sensors 16 are shear type foil strain gauges having normal (i.e. no force being applied) resistance values of 350Ω (ohms), each pair of sensors mounted on a planar region (as shown in FIGS. 13-16) and where excitation voltage (Vinput, +EX/−EX) is 10 Volts (although the signal voltage change (Vsig) being reported as millivolts-per-volt (mV/V)), and utilizing either a pair of connected Wheatstone bridge electronic networks 40, 40' (of the embodiment of FIG. 12b) or a pair of connected differential bridge networks 50, 50' (of the embodiment of FIG. 12c), the inventor observed the following signal values (in millivolts/volt) with respect to a 5000 lb force applied to the pin 14, either as downward force DF or as torque T (as noted), as shown in the table below:

|  | Downward Force | Torque Force |
| --- | --- | --- |
| Wheatstone bridge network (40, 40' in FIG. 12b) | −0.0167 mV/V | 0.6643 mV/V |
| Differential bridge network (50, 50' in FIG. 12c) | 0.0003 mV/V | 0.6605 mV/V |

Those of ordinary skill in the art will appreciate that various modifications to the invention as described herein will be possible without falling outside the scope of the invention. For example, although the load pin 14 herein is shown as a single elongate cylindrical member having an axial body 14a with longitudinal axis A extending between opposing ends 14e, 14f, preferably formed as one part and in one solid piece, it is also contemplated that the invention will work with a two-part (or split) load pin (not shown), wherein each of the two parts of such pin would correspond to the peripheral portions 14p, 14p' (with corresponding ends 14e and 14f) along with the appropriate transitional portions 15a, 15b, and wherein with the medial portion 14m is then split into two parts (and each such parts then corresponding with the relevant transitional portions 15a or 15b). In such an embodiment, each of the two parts of the split load pin is then mounted within the coupler 22 in the preferred orientation and wherein each part is mounted substantially the same distance from what would otherwise be the center of the medial portion CM of a single load pin 14.

In the claims, the word "comprising" is used in its inclusive sense and does not exclude other elements being present. The indefinite article "a" before a claim feature does not exclude more than one of the features being present.

The invention claimed is:

1. A load pin for measuring force, comprising:
   a longitudinal axis, a first end at one end of the longitudinal axis, a second end at another end of the longitudinal axis, a central plane parallel to the longitudinal axis, a first side on one side of the central plane, and a second side on another side of the central plane;
   a differential bridge electronic circuit having a first branch with two gauges mounted to a first planar region and a second branch with two gauges mounted to a second planar region;
   wherein the first and second planar regions are one of:
      A. a first and second inner surface a bore, wherein the first and second inner surfaces of the bore are substantially perpendicular to the longitudinal axis of the load pin; and
      B. a first floor within a first milled pocket and a second floor within a second milled pocket, wherein the first and second floors are generally parallel to the longitudinal axis;
   wherein the two gauges of the first branch are mounted to both receive a deformation force in a first direction and the two gauges of the second branch are mounted to both receive a deformation force in a second direction.

2. The load pin of claim 1 wherein the two gauges each of said first and second branch are strain gauges.

3. The load pin of claim 1 wherein the gauges are shear type foil strain gauges.

4. The load pin of claim 1 wherein the load pin is an elongate cylindrical member having an axial body.

5. The load pin of claim 1 wherein the gauges are foil strain gauges having parallel lines, the gauges being more sensitive to strain and forces that are in the orientation of said parallel lines.

6. The load pin of claim 5 wherein said foil strain gauges are mounted within their respective planar regions so that the orientation of their parallel lines are parallel to the longitudinal axis.

7. The load pin of claim 5 wherein said foil strain gauges are mounted within their respective planar regions so that the orientation of their parallel lines are within the central plane.

8. A system for measuring force comprising:
   a load pin having an outer surface, a longitudinal axis, a first end at one end of the longitudinal axis, a second end at another end of the longitudinal axis, a central plane parallel to the longitudinal axis, a first side on one side of the central plane, and a second side on another side of the central plane;
   a differential bridge electronic circuit having a first branch with gauges R1 and R2 and a second branch with gauges R3 and R4;
   a first planar region wherein gauges R1 and R2 are mounted to both receive a deformation force in a first direction;
   a second planar region wherein gauges R3 and R4 are mounted to both receive a deformation force in a second direction;
   wherein the first and second planar regions are one of:
      A. a first and second inner surface a bore, wherein the first and second inner surfaces of the bore are substantially perpendicular to the longitudinal axis of the load pin; and
      B. a first floor within a first milled pocket and a second floor within a second milled pocket, wherein the first and second floors are generally parallel to the longitudinal axis.

9. The system of claim 8 wherein the two gauges each of said first and second branch are strain gauges.

10. A load pin having a central plane for measuring force comprising:
    a differential bridge electronic circuit having a first branch with two gauges and a second branch with two gauges;
    a first planar region on a first side of the central plane and a second planar region on a second side of the central plane;
    wherein the gauges are electrically connected such that the two gauges in the first branch of said differential bridge circuit are mounted on the first planar region and the two gauges in the second branch of the differential bridge circuit are mounted on the second planar region;
    wherein the first and second planar regions are one of:
       A. a first and second inner surface a bore, wherein the first and second inner surfaces of the bore are substantially perpendicular to the longitudinal axis of the load pin; and
       B. a first floor within a first milled pocket and a second floor within a second milled pocket, wherein the first and second floors are generally parallel to the longitudinal axis;
    wherein the application of force deforms the two gauges mounted to the first planar region in a first direction and the two gauges mounted to the second planar region in a second direction.

11. The load pin of claim 10 wherein the two gauges each of said first and second branch are strain gauges.

12. The load pin of claim 10 wherein the gauges are foil strain gauges having parallel lines, the gauges being more sensitive to strain and forces that are in the orientation of said parallel lines.

13. The load pin of claim 12 further comprising a longitudinal axis and said foil strain gauges are mounted within their respective planar regions so that the orientation of their parallel lines are parallel to the longitudinal axis.

14. The load pin of claim 12 further comprising a horizontal plane and said foil strain gauges are mounted within their respective planar regions so that the orientation of their parallel lines are within the horizontal plane.

15. A method for measuring force comprising:
    providing a load pin having a central plane, a first planar region on a first side of the central plane with a first branch of an electric circuit with two gauges having parallel lines in a plane, and a second planar region on a second side of the central plane with a second branch of the electronic circuit with two gauges having parallel lines in the plane, wherein the gauges are electrically connected such that one branch is mounted on the first planar region and the other branch is mounted on the second planar region;

applying force to the load pin so that the first branch is deformed by force in a first direction when the second branch is deformed by force in a second direction; and measuring any unbalance of current flow through the electric circuit to determine an amount of force applied to the load pin.

16. The method of claim 15 wherein the force is rotational torque applied parallel to the plane.

\* \* \* \* \*